(12) United States Patent
Bas et al.

(10) Patent No.: US 9,952,340 B2
(45) Date of Patent: Apr. 24, 2018

(54) CONTEXT BASED GEO-SEISMIC OBJECT IDENTIFICATION

(71) Applicants: GENERAL ELECTRIC COMPANY, Schenectady, NY (US); EXXONMOBIL UPSTREAM RESEARCH COMPANY, Houston, TX (US)

(72) Inventors: Erhan Bas, Niskayuna, NY (US); Gianni Matteucci, Houston, TX (US); Ali Can, Niskayuna, NY (US); Jens Rittscher, Ballston Lake, NY (US); Weina Ge, Niskayuna, NY (US); Kelly E. Wrobel, Houston, TX (US); Matthias G. Imhof, Katy, TX (US); Leslie A. Wahrmund, Kingwood, TX (US); Antonio Rafael da Costa Paiva, Houston, TX (US)

(73) Assignees: GENERAL ELECTRIC COMPANY, Schenectady, NY (US); EXXONMOBIL RESEARCH UPSTREAM, Houston, TX (US)

( * ) Notice: Subject to any disclaimer, the term of this patent is extended or adjusted under 35 U.S.C. 154(b) by 1051 days.

(21) Appl. No.: 14/145,099

(22) Filed: Dec. 31, 2013

(65) Prior Publication Data
US 2014/0278115 A1 Sep. 18, 2014

Related U.S. Application Data

(60) Provisional application No. 61/798,669, filed on Mar. 15, 2013.

(51) Int. Cl.
G01V 1/00 (2006.01)
G01V 1/28 (2006.01)
(Continued)

(52) U.S. Cl.
CPC ............. *G01V 1/30* (2013.01); *G01V 1/301* (2013.01); *G01V 99/005* (2013.01); *G01V 2210/64* (2013.01)

(58) Field of Classification Search
CPC ........ G01V 1/30; G01V 1/301; G01V 99/005; G01V 2210/64
See application file for complete search history.

(56) References Cited

U.S. PATENT DOCUMENTS

| 4,916,615 A | 4/1990 | Chittineni |
|---|---|---|
| 4,992,995 A | 2/1991 | Favret |

(Continued)

FOREIGN PATENT DOCUMENTS

| JP | 2001084462 | 3/2001 |
|---|---|---|
| JP | 2003293257 | 10/2003 |

(Continued)

OTHER PUBLICATIONS

Valet, L., et al.; "Performance evaluation of a fuzzy fusion system for subsoil classification", Information Fusion, 2000 Proceedings of the 3rd International Conference Jul. 2000, pp. TuB5—9-15.

(Continued)

*Primary Examiner* — David M Gray
*Assistant Examiner* — Geoffrey T Evans
(74) *Attorney, Agent, or Firm* — Fletcher Yoder, P.C.

(57) ABSTRACT

A workflow is presented that facilitates defining geocontextual information as a set of rules for multiple seismic attributes. Modeling algorithms may be employed that facilitate analysis of multiple seismic attributes to find candidate regions that are most likely to satisfy the set of rules. These candidates may then be sorted based on how well they represent the geocontextual information.

14 Claims, 21 Drawing Sheets
(14 of 21 Drawing Sheet(s) Filed in Color)

(51) Int. Cl.
*G01V 1/30* (2006.01)
*G01V 99/00* (2009.01)

(56) References Cited

U.S. PATENT DOCUMENTS

| | | |
|---|---|---|
| 5,047,991 A | 9/1991 | Hsu |
| 5,265,192 A | 11/1993 | McCormack |
| 5,274,714 A | 12/1993 | Hutcheson et al. |
| 5,465,308 A | 1/1995 | Hutcheson et al. |
| 5,416,750 A | 5/1995 | Doyen et al. |
| 5,440,525 A | 8/1995 | Dey-Sarkar et al. |
| 5,444,619 A | 8/1995 | Hoskins et al. |
| 5,453,958 A | 9/1995 | Neff |
| 5,539,704 A | 7/1996 | Doyen et al. |
| 5,586,082 A | 12/1996 | Anderson et al. |
| 5,677,893 A | 10/1997 | de Hoop et al. |
| 5,852,588 A | 12/1998 | de Hoop et al. |
| 5,940,777 A | 8/1999 | Keskes |
| 6,052,650 A | 4/2000 | Assa et al. |
| 6,092,025 A | 7/2000 | Neff |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,466,923 B1 | 10/2002 | Young |
| 6,473,696 B1 | 10/2002 | Oayia et al. |
| 6,526,353 B2 | 2/2003 | Wallet et al. |
| 6,574,565 B1 | 6/2003 | Bush |
| 6,574,566 B2 | 6/2003 | Grismore et al. |
| 6,587,791 B2 | 7/2003 | Dablain et al. |
| 6,603,313 B1 | 8/2003 | Srnka |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1 | 2/2006 | Acosta et al. |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,184,991 B1 | 2/2007 | Wentland et al. |
| 7,188,092 B2 | 3/2007 | Wentland et al. |
| 7,203,342 B2 | 4/2007 | Pedersen |
| 7,206,782 B1 | 4/2007 | Padgett |
| 7,222,023 B2 | 5/2007 | Laurent et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,295,706 B2 | 11/2007 | Wentland et al. |
| 7,295,930 B2 | 11/2007 | Dulac et al. |
| 7,308,139 B2 | 12/2007 | Wentland et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,660,674 B2 | 2/2010 | Magill et al. |
| 7,697,373 B1 | 4/2010 | Padgett |
| 7,881,501 B2 | 2/2011 | Pinnegar et al. |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,219,320 B2 | 7/2012 | Saenger |
| 8,219,322 B2 | 7/2012 | Monsen et al. |
| 8,326,542 B2 | 12/2012 | Chevion et al. |
| 8,346,695 B2 | 1/2013 | Pepper et al. |
| 8,358,561 B2 | 1/2013 | Kelly et al. |
| 8,363,959 B2 | 1/2013 | Boiman et al. |
| 8,385,603 B2 | 2/2013 | Beucher et al. |
| 8,447,525 B2 | 5/2013 | Pepper et al. |
| 8,515,678 B2 | 8/2013 | Pepper et al. |
| 2005/0114831 A1 | 5/2005 | Callegari et al. |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop et al. |
| 2006/0184488 A1 | 8/2006 | Wentland |
| 2008/0123469 A1 | 5/2008 | Wibaux et al. |
| 2008/0185478 A1 | 8/2008 | Dannenberg |
| 2008/0270033 A1 | 10/2008 | Wiley et al. |
| 2010/0138368 A1 | 6/2010 | Stundner et al. |
| 2010/0174489 A1 | 7/2010 | Bryant et al. |
| 2010/0211357 A1* | 8/2010 | Li .................... B09C 1/00 702/181 |
| 2010/0211363 A1 | 8/2010 | Dorn et al. |
| 2010/0245347 A1 | 9/2010 | Dorn et al. |
| 2011/0042098 A1 | 2/2011 | Imhof |
| 2011/0063292 A1 | 3/2011 | Holl et al. |
| 2011/0118985 A1 | 5/2011 | Aarre |
| 2011/0255371 A1 | 10/2011 | Jing et al. |
| 2011/0307178 A1 | 12/2011 | Hoekstra |
| 2012/0053839 A1 | 3/2012 | Kugler et al. |
| 2012/0072116 A1 | 3/2012 | Dorn et al. |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0257796 A1 | 10/2012 | Henderson et al. |
| 2012/0322037 A1 | 12/2012 | Raglin |
| 2013/0006591 A1 | 1/2013 | Pyrez et al. |
| 2013/0064040 A1 | 3/2013 | Imhof et al. |
| 2013/0138350 A1 | 5/2013 | Thachaparambil et al. |
| 2013/0144571 A1 | 6/2013 | Pepper et al. |
| 2013/0158877 A1 | 6/2013 | Bakke et al. |
| 2017/0254911 A1* | 9/2017 | Can .................... G01V 1/306 |

FOREIGN PATENT DOCUMENTS

| | | |
|---|---|---|
| JP | 2005244200 | 9/2005 |
| JP | 2012220500 | 11/2012 |
| WO | WO 9964896 | 12/1999 |
| WO | 2009070536 A1 | 6/2009 |
| WO | 2011149609 A1 | 12/2011 |
| WO | WO 2011149609 A1 * | 12/2011 ............ G01V 1/306 |
| WO | 2013012469 A1 | 1/2013 |

OTHER PUBLICATIONS

Valet, L., et al.; "Multi-temporal SAR image analysis by a 3D graphic tool-based fuzzy fusion", Information Fusion, 2003 Proceedings of the 6th International Conference Jul. 2003, pp. 1478-1483.
International Search Report (ISA220) dated Aug. 1, 2014 for Application No. PCT/US2014/022743, 12 pages.
Fleiss, Joseph L.; "Measuring nominal scale agreement among many raters," Psychological bulletin, vol. 76, No. 5, p. 378, 1971.
Moore, A., "A tutorial on KD-trees," University of Cambridge Computer Laboratory Technical Report No. 209, 1991.
Pitas, I, et al., "Knowledge-Based Image Analysis for Geophysical Interpretation", Journal of Intelligent and Robotic Systems, vol. 7, Issue 2, pp. 115-137, Apr. 1993.

(56) References Cited

OTHER PUBLICATIONS

Castagna, John P.; et al.; "The use of spectral decomposition as a hydrocarbon indicator," vol. 8, No. 3, 2002.
Ward, Ronald W., et al., "AVO Calibration of GOM Deepwater: Results from 50 Fields," 2002.
Gibson, David, et al.; "Automatic Fault Detection for 3D Seismic Data," VII-th Digital Image Computing: Techniques and Applications, 2003.
Zhang, Doug, et al.; "Semi-Supervised Adapted HMMs for Unusual Event Detection," IEEE Computer Society Conference on Computer Vision and Pattern Recognition, 2005.
Felzenszwalb, Pedro F., et al.; "Pictorial structures for object recognition," International Journal of Computer Vision, vol. 61, Issue 1, pp. 55-79, Jan. 2005.
Bond, C.E.; "What do you think this is?Conceptual uncertainty," vol. 17, No. 11, 2007.
Rudolph, Kurt W.; "DHI/AVO Best Practices: a Worldwide Analysis," in AAPG, 2007.
Paris, Sylvain, et al.; "A Topological Approach to Hierarchical Segmentation using Mean Shift," IEEE Computer Society Conference on Computer Vision and Pattern Recognition, 2007.
Grundmann, M., et al.; "Efficient Hierarchical Graph-Based Video Segmentation," IEEE Computer Society Conference on Computer Vision and Pattern Recognition, 2010.
Chen, Xi, et al.; "Piecing Together the Segmentation Jigsaw using Context," International Conference on Computer Vision and Pattern Recognition, 2011.
Prskalo, Smiljan; "Application of relations between seismic amplitude, velocity and lithology in geological interpretation of seismic data", Journal of Hungarian Geomathematics, vol. 2, pp. 51-68.

\* cited by examiner

CONTEXT BASED GEO-SEISMIC OBJECT IDENTIFICATION

CROSS-REFERENCE TO RELATED APPLICATIONS

This application claims priority to U.S. Provisional Patent Application No. 61/798,669, entitled "Context-based Geo-Seismic Object Identification", filed Mar. 15, 2013, which is herein incorporated by reference in its entirety for all purposes.

BACKGROUND

The subject matter disclosed herein relates to the analysis of data, including seismic and other data, such as to identify features of interest.

Seismic data is collected and used for evaluating underground structures or closures, as well as other features that might otherwise not be discernible. Such seismic data may be useful in searching for mineral resources (such as hydrocarbons, coal, metals, water, and so forth) that are located underground and which may be otherwise difficult to localize with other remote sensing techniques or to explore just by drilling and excavating. In practice, the seismic data is derived based on the propagation of seismic waves through the various strata forming earth. In particular, the propagation of seismic waves may be useful in localizing the various edges and boundaries associated with different strata within the earth and with the surfaces of various formations or structures that may be present underground.

The seismic waves used to generate seismic data may be created using any number of mechanisms, including explosives, air guns, or other mechanisms capable of creating vibrations or seismic waves capable of spreading through the Earth's subsurface. The seismic waves may reflect, to various degrees, at the boundaries or transitions between strata or structures, and these reflected seismic waves are detected and suitably processed to form a set of seismic data that may be used to examine the subsurface area being investigated.

One challenge that arises in the context of these seismic investigations is in the interpretation and analysis of the large three-dimensional data sets that can be generated in a seismic survey project. In particular, seismic interpretation is a subjective process driven by the experience of the interpreter and the availability of software tools. Traditional computer software applications mostly provide visualization, feature extraction via digital signal processing, and workflow integration capabilities. There is not, at present, a computational framework that leverages the expert knowledge and sophisticated pattern recognition techniques to identify complex geo-objects from multiple seismic attributes.

BRIEF DESCRIPTION

In certain implementations, an inference system is disclosed that imitates the decision making of a human expert using geophysical concepts and expert knowledge. In such implementations, machine inference and expert feedback is utilized jointly to simultaneously analyze multiple seismic attributes (such as using one or both of parallel computing or joint statistics), that are not necessarily spatially co-located (i.e., the features of interest in one attribute are not in the same location as those of another attribute) but that are associated based on geological context. One proposed system utilizes prior knowledge and geophysical concepts to automatically identify and visualize new instances, anomalies and events. An automated search of the patterns, from obvious to subtle, that exist in the seismic data may be utilized to rank anomalies in the input volumes. In one embodiment, the inference engine uses a statistical technique, such as graphical modeling, to analyze multiple input attributes, which can span different scales (resolutions). In such embodiments, the inference engine also uses spatial contextual rules to identify locations where there are configurations in the feature/attribute space and in the geographical space that span all input attributes and best obey such rules. Similar configurations may be aggregated into clusters for brevity of representation. In certain implementations, uncertainty in the interpretation of a cluster is used as a measure to rank possible scenarios. Some or all of the ranked clusters may be displayed to an expert for validation. In one embodiment, expert feedback is stored to build a dictionary or other reference dataset and is used to update the initial model and inference engine parameters. As discussed herein, the disclosed approach has been tested in the context of seismic amplitude anomalies called Direct Hydrocarbon Indicators (DHIs) that are often used to calculate the probability of occurrence of hydrocarbons in a prospect. The best application to date of DHI technology is in siliciclastic environments (alternating layers of sands and shales). Another application of the same approach discussed here is in carbonate environments, for example to detect carbonate mounds.

In one embodiment, a data analysis system is provided. The data analysis system comprises a memory storing one or more routines and a processing component configured to execute the one or more routines stored in the memory. The one or more routines, when executed by the processing component, cause acts to be performed comprising: analyzing multiple input attributes of a geophysical or geological data volume using geocontextual modeling; calculating locations where there are configurations in the attribute space or in the geographical space that span the multiple input attributes and that obey a set of geocontextual rules; and scoring configurations in the data volume based on the calculations employing the geocontextual rules.

In a further embodiment, a non-transitory, computer-readable media, is provided that encodes one or more processor-executable routines. The routines, when executed by a processor, causes acts to be performed comprising: defining a set of rules for multiple seismic data attributes based on geocontextual information defined by a user; analyzing multiple attributes of a seismic volume using the set of rules to identify candidate regions within the seismic volume; and identifying, classifying, or ranking the candidate regions based on how well each respective candidate region conforms to the rules.

In an additional embodiment, a method is provided for analyzing seismic data. The method includes the act of accessing one or more rules related to multiple seismic data attributes, wherein the one or more rules comprise a set of spatial geocontextual rules. The one or more rules are parsed to generate a formula. A set of seismic attributes accessed and a set of scores or classifications are computed based on the set of seismic attributes and the formula. The scores or classifications are output.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present invention will become better understood when the following detailed description is read with reference to the accompanying drawings in which like characters represent like parts throughout the drawings, wherein.

DETAILED DESCRIPTION

Figure 1:
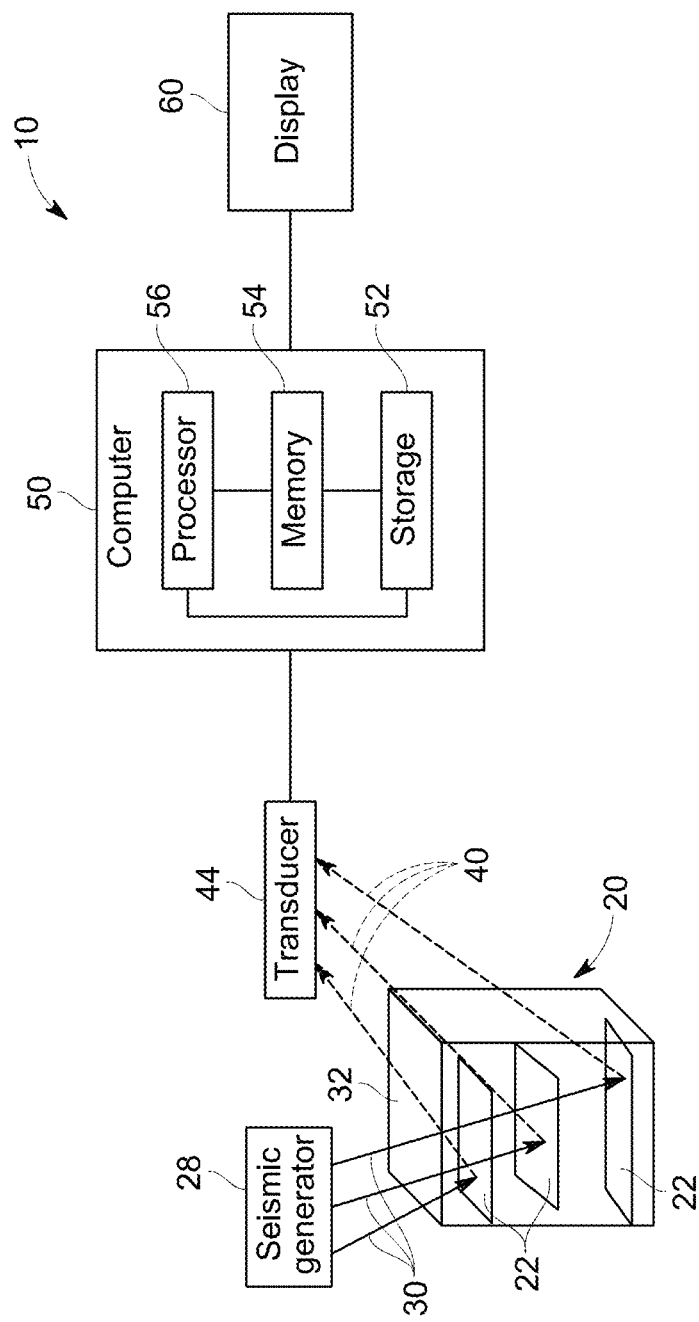
FIG. 1 depicts an example of a seismic data acquisition and analysis system, in accordance with aspects of the present disclosure.

As discussed herein, the approaches presently disclosed allow the automated and simultaneous analysis of multiple geo-structures and allow the evaluation of how the contextual relationships of multiple attributes within such geo-structures can be exploited while searching for hydrocarbon accumulations. Such an approach is in contrast to other approaches that generally focus on the manual and semi-subjective analysis of a single structure at a time, for example a 4-way closure (e.g., a mound) or a 3-way fault-delimited closure, and of the direct hydrocarbon indicators (DHIs) found within it. Though seismic data is generally discussed herein in order to provide a useful example and to facilitate explanation, it should be appreciated that other types of data may also be processed and analyzed as discussed herein. For example, other geophysical and/or geological data may be processed or analyzed as discussed herein, including, but not limited to: horizons, faults, geobodies, well trajectories, surface seeps, gravity and magnetic data, electromagnetic data, reservoir simulations, production data, and so forth.

With respect to DHIs, as used herein a DHI is a seismic attribute, which may often be associated with or used to calculate the probability of hydrocarbon presence in a prospect. There are more than a dozen DHI attributes, namely attributes derived from seismic data that can be associated (with geological and geophysical concepts and demonstrated through geophysical modeling), with the occurrence of hydrocarbon in the subsurface. Examples of DHI attributes include, but are not limited to: bright/dim spot, amplitude versus offset (AVO), flat spot, fit to structure, lateral amplitude contrast, frequency attenuation, phase (polarity) change, push down, A+B, lambda-mu-rho, fluid factor, spectral AVO, and so forth. Such DHI attributes may be used in the exploration for new fields for resources of interest. Ideally the underlying seismic data are processed for "true amplitude" to improve the confidence that the DHI attributes correspond to underlying rock properties rather than to acquisition and processing artifacts in the seismic data (namely the way the seismic data have been collected and manipulated prior to the analysis). Each DHI attribute (measure) has its own strengths and weaknesses.

The value of each DHI measure varies by region and depth. For example a Bright Spot attribute can be very valuable for gas exploration in North Adriatic Sea, whereas AVO can be a very valuable indicator in off-shore West Africa. There is also substantial depth dependency for most DHI measures. Using multiple DHI attributes, and how each one manifests itself relative to others, is a consideration in exploring for hydrocarbons in more challenging areas, such as in emerging fields with very little historical data, in deep water basins, overpressured prospects, or areas with poor data quality. Generally speaking, it may be desirable to have multiple DHIs present to increase the confidence in the actual presence of hydrocarbons.

While assessing chance of validity of a prospect using certain DHIs is conventionally done, jointly assessing the risk based on multiple DHI indicators, as described herein, is not conventionally done and has generally been impractical in view of the amount of manual processing needed to evaluate large volumes of seismic data.

Standard multivariate statistical methods such as clustering fail to analyze properly multiple DHI attributes because the best set of attributes are not generally co-localized in space. The best set of DHI attributes identify a region in a seismic data set as being anomalous by comparing its signature, polarity and amplitude, with respect to the background level, but also how they change above and below likely fluid contacts, and how they are distributed in reference to the structural elevation of the potential prospects. Essentially geoscientists look for multiple positive and reinforcing clues (i.e., attributes) to estimate the probability of occurrence of hydrocarbons in a subsurface interval. Further, individual, specialized geophysicists typically each have their own set of rules and "if else" statements that they commonly and implicitly refer to while coming up with a "play" scenario. This process can be subjective, and may depend on the experience of the geophysicist or of the committee used to evaluate the opportunities. There is, therefore, a need to integrate, automate, and make the results of a DHI analysis consistent and reproducible. While the preceding discussion relates to the use and relevance of DHIs and may help inform subsequent discussion, it should be appreciated, however, that such examples are provided merely to facilitate explanation and to provide useful context for explaining the present approach. Therefore, it should be appreciated that the present approach may also be utilized in other contexts and is not limited to use in the DHI context.

With this in mind, embodiments of a workflow are described below that enable a geophysicist to explicitly define geocontextual information as a set of rules for multiple attributes that may be of interest. Novel geocontextual modeling algorithms (such as graphical modeling approaches) are also shown that allow analysis of multiple attributes simultaneously (such as using parallel computing and/or joint statistic approaches) and automatically to find candidate regions that are most likely to satisfy the set of rules. These candidates are then sorted based on how well they represent the geocontextual information.

Turning to the figures, the present approach may be utilized in conjunction with a 3D seismic data set generated using any suitable seismic surveying system. As depicted in FIG. 1, a high-level overview of one such seismic surveying system 10 is provided by way of example. In the depicted example, a subsurface volume 20 is probed by the seismic surveying system 10. The subsurface volume 20 may typically include various layers or strata 22 at different depths and orientations within the volume 20. These various strata 22 define respective boundaries and transitions within the volume which may act to reflect waves (e.g., acoustic or shear waves) propagating through the subsurface volume 20. Likewise, other features or geobodies within the subsurface volume may also include surfaces, transitions, or boundaries that act to reflect seismic waves.

In the depicted example, a seismic generator 28 of some form (such as one or more controlled detonations, an air gun or cannon, or another suitable source of seismic waves) is part of the seismic surveying system 10. The seismic generator 28 can typically be moved to different positions on the surface of the volume 20 and can be used to generate seismic waves 30 at different positions on the surface 32 that penetrate the subsurface volume 20 under investigation. The various boundaries or transitions within the subsurface 20 (either associated with the various layers or strata 22 or with more complex geobodies) cause the reflection 40 of some number of the seismic waves 30. One or more receivers 44 at the surface 32 may be used to detect the waves 40 reflected by the internal structures of the subsurface volume 20 and to generate responsive signals (i.e., electrical or sonic signals).

These signals, when carefully processed, represent the internal boundaries and features of the subsurface volume 20. For example, in the depicted embodiment, the signals are provided to one or more computers 50 or other suitable processor-based devices that may be used to process the signals and generate a volume depicting the internal features of the subsurface volume 20. In one embodiment, the computer 50 may be a processor-based system having a non-volatile storage 52 (such as a magnetic or solid state hard drive or an optical media) suitable for storing the data or signals generated by the receiver 44 as well as one or more processor-executable routines or algorithms, as discussed herein, suitable for processing the generated data or signals in accordance with the present approaches. In addition, the computer 50 may include a volatile memory component 54 suitable for storing data and signals as well as processor-executable routines or algorithms prior to handling by the processor 56. The processor 56 may, in turn, generate new data (such as a volumetric representation of the subsurface volume 20 and/or a set of features of interest for further analysis) upon executing the stored algorithms in accordance with the present approaches. The seismically processed data generated by the processor 56 may be stored in the memory 54 or the storage device 52 or may be displayed for review, such as on an attached display 60.

Figure 2:
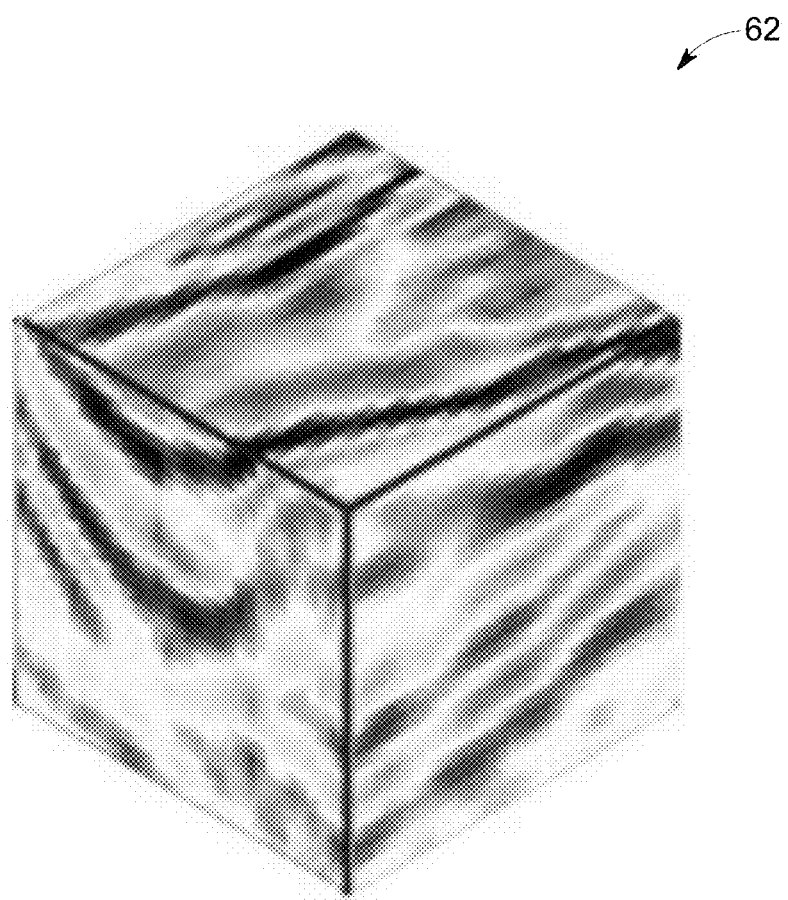
FIG. 2 depicts an example of a volume of seismic data for analysis, in accordance with aspects of the present disclosure.

Turning to FIG. 2, a representation of a portion 62 of 3D seismic data of a subsurface volume 20 is depicted. As depicted in FIG. 2, such a subvolume 62 may depict features of the subsurface volume 20, such as various strata, layers, and geobodies, which due to geological processes and time scales, may be at various orientations relative to one another. As will be appreciated, manual inspection of large amounts of such data may be challenging and time-consuming.

It may be worth noting that, unlike the present approach, conventional multi-variate data mining and classification techniques (such as cluster analysis, supervised or not, discriminant analysis, and neural networks) often imply the co-location of the variables, such as may be analyzed within a seismic data set 62. That is, the spatial information (XYZ coordinates for each observation entering into the analysis) when available, is not explicitly utilized in implementations of the present approach.

For example, assume a problem with N objects (=observations), each defined by M variables (=attributes). Each observation typically corresponds to a XYZ location within a seismic dataset and all attributes are present for each observation (see Table 1 below). In this example, if an observation is missing an attribute, the observation may be discarded, ignored, or interpolated or otherwise provided in accordance with one or more empirical or statistical rules. Conventional statistical techniques (advanced or not) investigate and search for relationships among variables on the same "rows" (namely, the same location in this context). There is no investigation of relationships across "rows", namely with explicit offsets. Thus the XYZ locations are not explicitly used (at most they are used to select Regions of Interest (ROI), where the relationships are first developed, before being routinely applied). Therefore, in conventional statistical approaches there is no spatial (or geographical)

context employed within the analysis. Their main focus is to identify a "feature of interest" in the "attribute space", rather than a combination of "attribute space" and "geographical location" in its most general sense, namely including geographical offsets.

TABLE 1

| Observation | X | Y | Z | Var1 | Var2 | Var3 | ... | VarM |
|---|---|---|---|---|---|---|---|---|
| 1 | $x_1$ | $y_1$ | $z_1$ | $Var1_1$ | $Var2_1$ | $Var3_1$ | ... | $VarM_1$ |
| 2 | $x_2$ | $y_2$ | $z_2$ | $Var1_2$ | $Var2_2$ | $Var3_2$ | ... | $VarM_2$ |
| 3 | $x_3$ | $y_3$ | $z_3$ | $Var1_3$ | $Var2_3$ | $Var3_3$ | ... | $VarM_3$ |
| ... | ... | ... | ... | ... | ... | ... | ... | ... |
| N | $x_N$ | $y_N$ | $z_N$ | $Var1_N$ | $Var2_N$ | $Var3_N$ | ... | $VarM_N$ |

Further, as will be appreciated, conventional statistical techniques often fail to adequately deal with spatial data because their assumption of "independent observations" is often not valid in practice. That is, in the seismic data context, there often are correlations among observations that may be based on spatial relationships, caused by the way the data is processed, and also due to the underlying geologic processes the seismic data respond to. Thus, an observation at one set of XYZ coordinates may be correlated to what is observed at another (e.g., nearby) XYZ coordinate. By way of example, a spatial relationship (i.e., correlation) may arise because seismic migration algorithms and the velocity models on which they depend are imperfect and may not be able to collapse a local response to a single trace. That is, there may be smearing. Vertical relationships (i.e., correlations) may arise because the seismic signal has a certain frequency content (which changes with depth and conditions in the overburden) which dictates that multiple seismic samples are affected by a very localized geological boundary. This is referred to as seismic interference effect.

Graphical modeling, as discussed herein with respect to certain implementations, uses such spatial variables (and therefore employs more variables than a conventional statistical technique applied to the same problem) and employs rules on how to parse their values based on their spatial context (e.g., above, below, next to, within a certain distance, coincident, etc.). Thus, graphical modeling may be better suited than conventional statistical techniques to deal with observations that fit within an inherent spatial context and that have spatial correlations (as opposed to conventional approaches where each observation is implicitly "independent"). While graphical modeling is discussed herein by way of example, it should be appreciated that graphical modeling is only one type of contextual modeling that may be suitable for use with the presently disclosed approaches.

In addition, it may be worth noting that conventional statistical techniques often look for "clusters" of interesting anomalies only in the M-dimensional "feature space", also known as the "attribute space" herein. In contrast, graphical modeling, as discussed herein, uses the additional spatial variables to look for "clusters" of interesting anomalies in the "physical space" by exploiting the geocontextual rules provided by the user. As such, graphical modeling may provide a more exhaustive and comprehensive approach to looking for anomalies or patterns in the data, ranging from the most obvious to the more subtle anomalies.

Further, some useful objects that are being captured via attributes have smaller scale than others. In certain implementations, as discussed herein, a lattice with larger spacing may be created for such larger objects. The net result, in such implementations, is a faster and more efficient computation of the configurations (which may be fewer), clusters, and scores.

Figure 3:
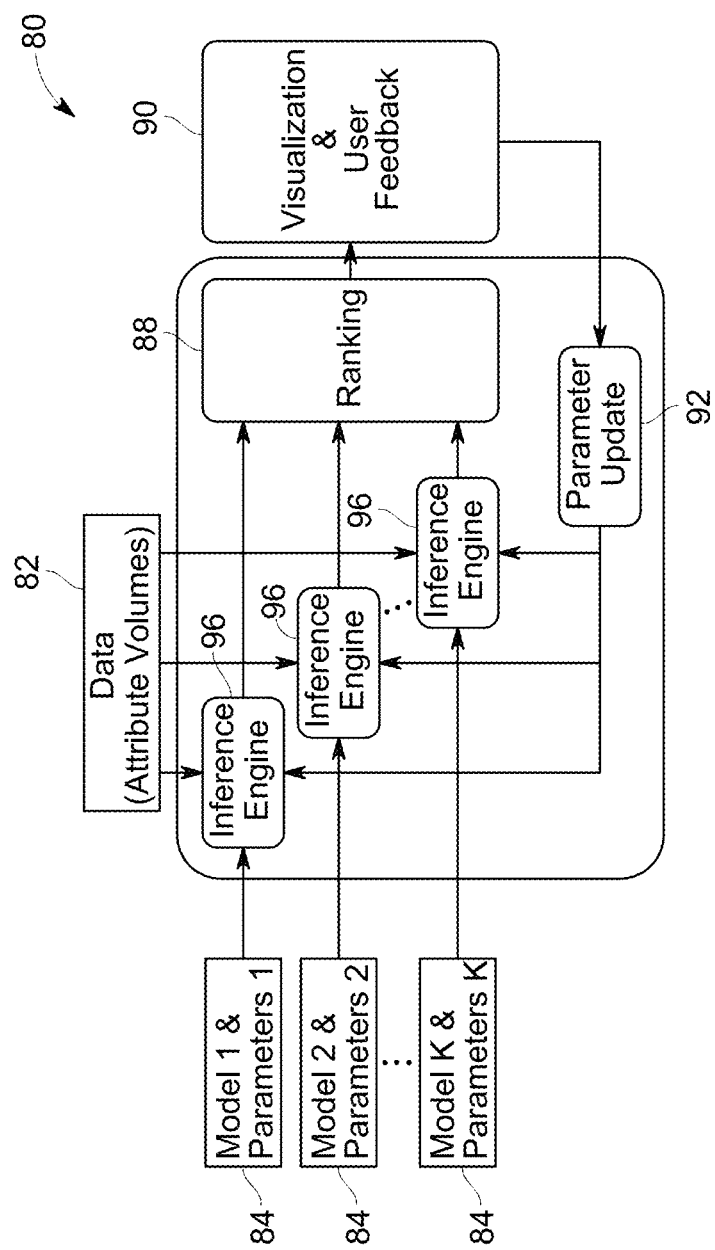
FIG. 3 depicts an example of an inference system for evaluating seismic data using geological and geophysical context that is embodied in the form of contextual rules and constraints in model files, in accordance with aspects of the present disclosure.

With the foregoing in mind, and turning to FIG. 3, an example of an inference system 80 (such as may be based on or implemented in the computer 50 of FIG. 1) is depicted that utilizes geophysical modeling and expert knowledge to interpret seismic data 82 and which avoids many of the deficiencies of conventional analysis noted above. Prior to discussion of the system 80, the following terms, which are used throughout, are described so as to facilitate the subsequent discussion.

Object: Objects are the building elements of complex systems. Objects have attributes, locations and relations to one another. Individual constraints can be imposed for each object (such as size), or comparative constraints can be imposed between objects (such as distance). Objects are denoted herein as O1, O2, . . . , OK.

Attribute: Attributes are the features and characteristics that objects can have. In pattern recognition, they are sometimes referred as appearance. By way of example, a seismic attribute, as used herein, may be the mathematical manipulation (in the vertical sense, lateral sense, or both, such as a single trace or multiple trace, windowed or not) of a conventional seismic product. Note that an output of the inference engine is by itself an attribute which may be referenced as a characteristic of an object. Attributes of are denoted herein as A1, A2, . . . , AJ.

Configuration: A configuration is an ensemble of objects where each object has a set of attributes and spatial coordinates associated with it, and two or more objects are associated through spatial comparative rules. A configuration is denoted herein as C.

Simple Rules: These are base form of rules that describe an individual object. Simple rules do not show comparison between objects. In linguistics, this is similar to a "simple adjective".

Comparative Rules: Rules that compare two or more objects; similar to "comparative adjectives" in linguistics.

Simple Terms: Unary function terms that map simple rules to mathematical functions, hence simple rules can be quantified or measured. These terms are user defined, and they are not unique. For example, the formulation of a simple term "HIGH" can be mathematically defined as the absolute value of the amplitude or square of the amplitude.

Comparative Terms: Pairwise function terms that map comparative rules to mathematical functions, hence comparative rules can be quantified or measured. These terms are user defined, and they are not unique. For example formulation of a simple term "ABOVE" can be mathematically defined in multiple ways.

Input model file: This is the file in which the user defines the geocontextual information in the form of simple and comparative rules. For example a simple rule can be defined as "Object-O1 has HIGH Attribute-A1", and a comparative rule can be defined as "Object-O2 is ABOVE Object-O1". The input model file defines the contextual rules. Comparative rules, when specified, use a description of relative location (e.g., position in XYZ space). As used herein, the input model file defines contextual rules that (a) use at least two objects and (b) compare them by their relative position, such as using a XY, XYZ, or, more generally, a XYZ+time frame.

Definitions similar to those defined above are commonly used in ontology and lexicons. For example in the context of face recognition from images, objects correspond to the anatomy of a face, such as "eyes, eyebrows, nose, lips, ears, etc." For example if the images are colored, the red channel can be an attribute for lips. The face is the configuration of its unit elements—objects. A sample simple rule is "LIP has HIGH RED" where RED is the attribute and LIP is the object. A sample comparative rule is "NOSE is ABOVE LIPS". A sample constraint can be "NOSE is WITHIN 100 pixels of LIPS". The input of the system is defined and described below.

In one implementation, the inference system 80 imitates the decision making of a human expert based on geological and geophysical context that is embodied in the form of geocontextual rules and constraints in model files 84 that are used by an inference engine 96 in analyzing the respective attributes within the data 82. For example, in certain implementations machine inference and expert feedback is utilized jointly to simultaneously analyze multiple seismic attributes embodied in the data 82. Simultaneous analysis may be accomplished using one or both of parallel computing or joint statistics.

In the depicted example, uncertainty in the interpretation of an event (i.e., a "configuration") inferred by the inference engine 96 may be used as a measure to rank (block 88) possible scenarios. In certain embodiments, some or all of the ranked configurations are displayed (block 90) to a reviewer (e.g., an expert) for validation. Feedback from such reviewers may be stored to build a dictionary or other reference dataset which may be used to update (block 92) the initial model and inference engine parameters. For example, in one such example the system 80 tunes itself by optimizing its internal parameters (Parameter Update 92) such that the system 80 generates the ranking that best adheres to the expert feedback. In certain implementations, the system 80 is designed to support multiple users or multiple hypotheses by enabling multiple models and parameters 84 as input. In one embodiment, the inference system 80 exploits geocontextual modeling based on the relationships among DHI attributes using graphical modeling techniques. For example, such graphical modeling techniques may be used where geocontextual information is incorporated in the analysis, such as to constrain segmentation results, to perform object recognition where a geometric relationship among parts of an object are utilized for the recognition, or to perform event detection where temporal dependencies are modeled by a particular type of graphical models, such as Hidden Markov Models.

While the above example provides a general overview of the present approach in the context of a system 80 or device, it should also be appreciated that this approach may also be contemplated in the context of operational or algorithmic steps, (e.g., an automated method). For example, in one embodiment a presently contemplated method includes the steps of: (1) translation of some DHI characteristics in a set of attributes 82. These DHI attributes can be at multiple scales and resolutions (and may be derived from seismic or non-seismic data); (2) translation of some practical DHI analysis rules 84, into algorithms. The algorithms may or may not employ thresholding, and typically define the spatial relationships among attributes for the successful scenarios; (3) a method (the inference engine 96 or Graphical Modeling in one example) is implemented that uses the multiple attributes AND their geocontextual rules to explore quantitatively and systematically a portion of the survey or the whole survey; and (4) each potential lead may be ranked (block 88) by a total score, size, location, and so forth, and evaluated based on the contribution of each attribute to the total score. The net result, in such an embodiment, is a ranked list of potential leads that can be sorted in multiple ways and the corresponding results visualized in the 3D space. Reviewers can then use this list to compare it with their expert opinion or historical results, select one or more of the prospects for further more detailed DHI analysis, or recognize the contribution of individual attributes and verify whether the underlying seismic processing or calculations are adequate.

Figure 4:
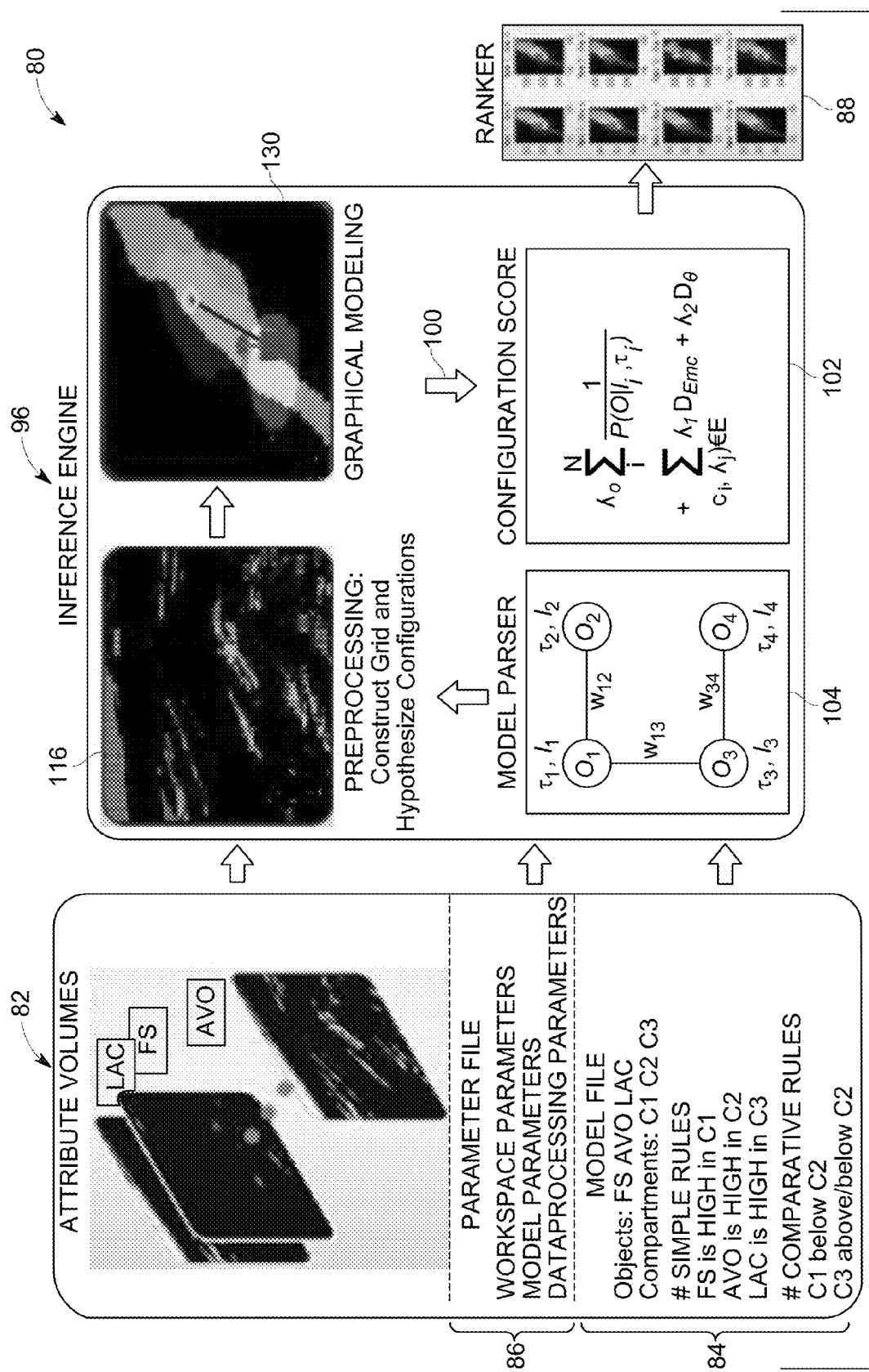
FIG. 4 depicts an illustrative example of the system of FIG. 3, in accordance with aspects of the present disclosure.

Turning to FIG. 4, an illustrative example of the system 80 is provided in the context of one model file 84 and showing the components of the inference engine. The system 80 takes expert-defined geocontextual model file(s) 84, a set of attributes (input data) 82, and parameters 86 related to the model(s) 84 as input. The user-defined model file 84 specifies the simple and comparative rules for different objects.

The inference engine 96 examines the feasible configurations that satisfy the geocontextual rules and computes a score 102 (e.g., a confidence score) for each configuration 100. The configuration list, in this example, is ranked by the user in the GUI according to various criteria such as the graphical modeling score and the spatial extent (or, its gross volume as captured by the number of pixels, or its average location in depth, or a number of other conditions such as but not limited to the highest score of any one attribute or a pairs of attributes). An example graph derived from the model file and representing a configuration C with four objects {O1, O2, O3, O4} is depicted with respect to the model parser 104.

In the depicted example, the inference engine has a model parser 104, where any simple or comparative rule is converted into a graph structure that inference engine 96 can recognize and process. The user defines the logical and algebraic definitions of simple terms and comparative terms. As used herein the phrases "logical definition" and "algebraic definition" are explicitly differentiated from one another. While a logical definition is binary (TRUE or FALSE) in nature, the algebraic definition is a smooth cost function that can measure the divergence from the ideal case. For example, one can map a simple rule "HIGH" to a logical simple term in the form of U(A−mean(A)) where U( ) is the unit step function. Similarly, one can use the difference ($e^{-|A-mean(A)|}$) as an algebraic simple term to measure divergence (higher values are more divergent), where, "e" is the natural logarithm. More exemplary rules and their associated terms are discussed in the case study section below.

The purpose of the model parser is to convert a set of rules written in text with associated cost functions into a template graph. However, it is also possible to input the graph itself to the inference system 80 as a template to be reasoned for. This enables the system 80 to be highly flexible to work on any complex configuration. Thus, in the depicted example, the proposed system 80 gets user defined rules 84 as well as their logical and algebraic definitions as input and converts these to a template graph, the structure of which is determined by the number of objects and the relation rules among them. Specifically, the objects become the sites in the graph and the relation operations determine the edges between the nodes. An example of an expert input model 84 (model.txt) is as follows:

TABLE 2

Sample input model file. (Lines starting with # are comments.)

```
# associated parameter file
/XYZ/parameters.txt
#list of attributes; space separated
Attributes: A1 A2 A3
#List of objects in configuration
Objects: O1 O2 O3
number of simple rules
NUM_SIMPLE: 4
#list of simple rules in the format: Object has
(HIGH/LOW/etc) Attribute
S: O1 has HIGH A1
S: O1 has HIGH A2
S: O2 has HIGH A2
S: O3 has HIGH A3
#number of comparative rules between the objects
NUM_COMPARATIVE: 2
#list of comparative rules in the format: Object1
(ABOVE/BELOW/etc)
Object2
C: O1 BELOW O2
C: O3 ABOVE-BELOW O1
# plugins
func FUN = logicalFUN & algebraicFUN
F: HIGH = logicalHIGH & algebraicHIGH
F: BELOW = logicalBELOW & algebraicBELOW
F: ABOVE-BELOW = logicalABOVE-BELOW &
algebraicABOVE-BELOW
```

In this example file, there are 3 input attribute volumes (A1, A2, and A3) and the expert's model has 3 objects (O1, O2, and O3). The expert defines 4 simple and 2 comparative rules. The user also defines an associated plugin (FUN) for each rule that consists of a logical function that checks if a rule is satisfied (logicalFUN) and an algebraic function that evaluates the confidence cost of the rule (algebraicFUN). Each rule might have customized plugin functions. For example, the definition of HIGH can be the same, i.e. with regard to a single threshold, for all simple rules or might change from one rule to another. This provides the expert with further control over the decision mechanism. A more detailed example for the logicalFUN and algebraicFUN functions is provided in the case study section below. In order to hypothesize a configuration, the model parser submodule 104 derives a template graph from the input model file 84.

Figure 5:
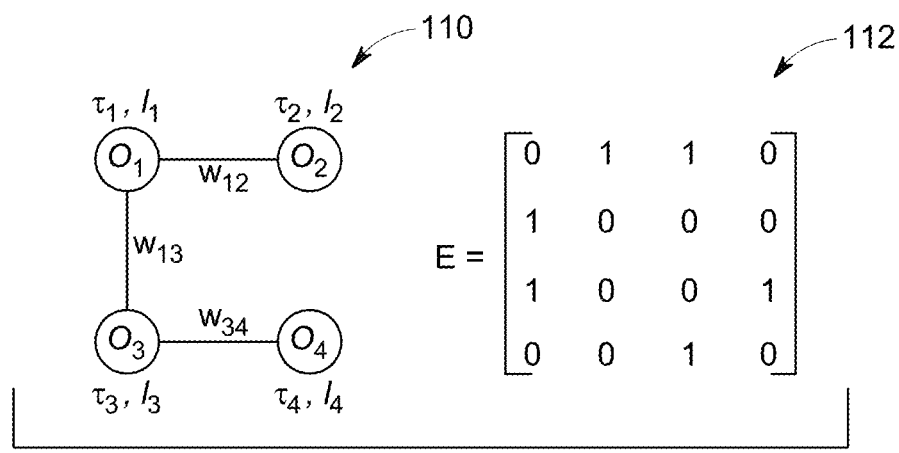
FIG. 5 depicts a template graph representing a configuration, in accordance with aspects of the present disclosure.

FIG. 5 shows an example template graph 110 representing a configuration C with four objects {O1, O2, O3, O4}. Each object Oi is represented by a circular node in the graph 110 and its spatial location is denoted as li. The edges between the nodes encode the contextual relationship between the objects and are determined by the connectivity matrix 112 $E=\{e_{ij}\}$. Object Oi is connected with object Oj if an entry $e_{ij}$ in E is 1. Each edge has a weight as a function of the (dis)similarity $W=\{w_{ij}\}$ between the nodes, i.e. algebraicFUN. As shown in the graph, the model parameter set $\theta=(\tau, E, w)$ consists of two parts: parameters associated with individual nodes and parameters associated with each edge. The former is used in the simple term and the latter in the comparative term in Equation 6 below. Specifically, each individual node Oi has an appearance parameter $\tau_i$ that controls the threshold for its attribute feature. Each edge between two nodes Oi and Oj has a weight parameter $w_{ij}$ that represents the significance of the comparative relationships between the two objects.

As noted above, the inference engine 96 also accepts as an input a parameter file 86 In one embodiment, the parameter file 86 outlines how to combine various input attributes in a context. In one embodiment of the present system, there may be 3 sets of parameters to be defined by the user:

(1) Workspace Parameters—These are system dependent parameters, e.g. path of the data files, output folder name, and so forth;

(2) Model Parameters—These parameters are related to the structure of the template model graph 110 and associated function plugins that convert the simple and comparative rules into quantitative measures as cost values (edge weights in the graph). As shown in the graph in FIG. 5, the model parameter set $\theta=(\tau, E, w)$ consists of two parts: parameters associated with individual nodes and parameters associated with each edge. Parameters related to nodes may be associated with the aforementioned simple rules. Similarly, parameters related to edges may be associated with comparative rules. For example, reconsider the aforementioned simple rule "Object-O1 has HIGH Attribute-A1", user defines the logicalHIGH function (mentioned in the input model file) and sets a range for HIGH-LOW by setting a simple (unary) threshold in the parameter file, e.g. "A1 is HIGH if more than 0.5". As mentioned earlier, one proposed system also maps such relative measures into a confidence score using graphical modeling to reason any configuration, e.g. $F(A)=|A-0.5|*U(A-0.5)$, where $U(.)$ is a unit step function. In another example, consider also a comparative rule stating: "O1 is WITHIN 100 voxels of O2". An expert can define proximity of objects with a logicalWITHIN function, where any configuration having O1 and O2 pair that is more than 100 voxels (distance threshold) apart, is unlikely to be present; and (3) Preprocessing parameters—These are parameters used in a preprocessing step, which are related mostly to the data structure and are adjusted by the expert based on the computational power available. These parameters may define the grid spacing or the region of interest (ROI) within which all the computations are performed. As the number of edges increases combinatorially with the number of objects that scales linearly with the size of the input data, a preprocessing step 116 may be employed to downsample the attribute size and eliminate any unlikely configuration based on the model file to make inference calculations scalable and feasible. Table 3 depicts a sample parameter file 86. In this example, the expert sets the paths in the first workspace parameter section. Then parameters related to the model file 84 are described in the second part. For example, parameters of simple and comparative rules can be set in this model parameter section. In order to make the system flexible, the user can define distances in the x-y-z directions separately or can define a single distance as function of them. Lastly, preprocessing parameters (i.e., data structure parameters), such as the grid size and the ROI size are set in a third section. Any experiment specific parameters such as type of the input (3D volume or 2D slice) may also be added to this section.

TABLE 3

Sample input parameter file

WORKSPACE PARAMETERS

```
# Set up the workspace #
PATH = /projects/ABC
#Name of the current working survey
SURVEYNAME = XYZ
#Model file name
#number of input dimension
```

TABLE 3-continued

Sample input parameter file

DIM = 3D
...
MODEL PARAMETERS maximal spatial distance allowed between O1 and another object
in a configuration when generating possible configurations
MaxDistanceToO1= [L_x L_y L_z] voxels
...
Attribute-A1 high threshold
A1.high = 0.5
...
PREPROCESSING PARAMETERS

Region of interest to be processed: a vector of length 2*D, where
D is the dimension of the input attribute map (2D or 3D)
[x-start x-end y-start y-end z-start z-end], in pixels
ROI = [x_low x_high y_low y_high z_low z_high]
configure the first attribute A1
size of the structured grid: a vector of length D
A1.grid_size = [7 7 7]
configure the second attribute A2
A2.grid_size = [7 7 7]

As noted above with respect to FIG. 4, this figure also depicts the inference engine 96 as performing a preprocessing step 116. For example, in one embodiment, such a preprocessing step may be construed as grid construction and configuration generation. In particular, in order to downsample the number of instances, a grid structure may be generated for each input attribute. Grids are a lower resolution representation of the input data 82. The grids, when employed, may be generated to: i) sample configuration hypotheses, ii) simplify the analysis/scoring and iii) remove un-interesting small scale features. Each compartment in a configuration has a spatial location sampled from grid.

Grid may be constructed in two ways: structured and unstructured. Structured grids are equivalent to the uniformly down-scaling of the original seismic data onto a lattice structure. For example, if the original data is of dimension 100×100×1000, then at the original resolution, it has 10,000,000 grid locations. Instead a structured grid with a $\epsilon$-box size of 10×10×10 yields 10000 grid locations. By changing the grid size, the data spacing ($\epsilon$) is, effectively, being changed. Intuitively, a large volume is divided into smaller non-overlapping subsets, where each subset ($\epsilon$-box neighborhood) is represented by a single instance through some averaging within this neighborhood. Although other types of neighborhood definitions, e.g. $\epsilon$-ball, k-nearest neighbor, etc., are also possible, in a structured grid the distance between consecutive locations are fixed, in other words, sampling is fixed for a given input attribute.

Figure 6:
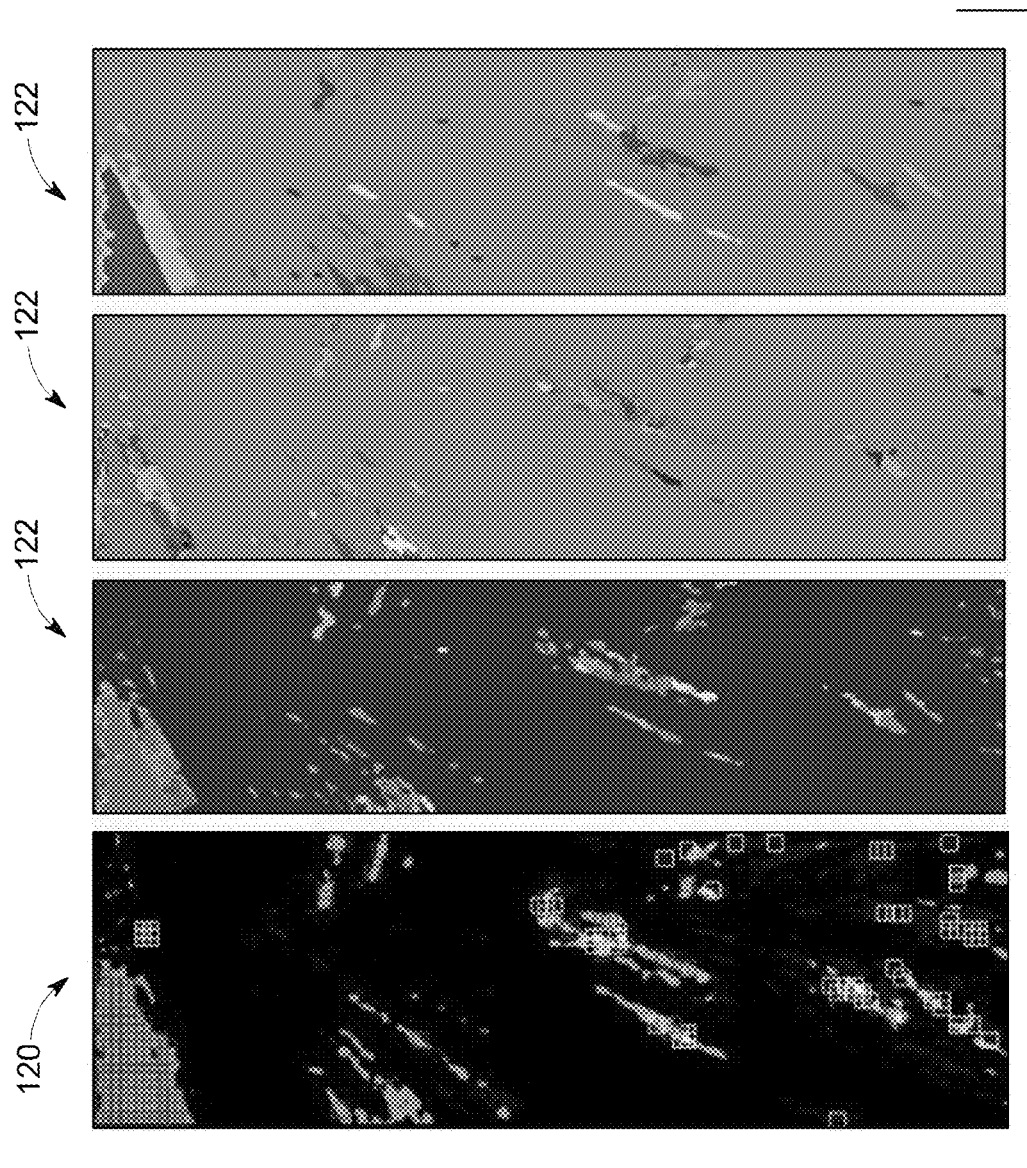
FIG. 6 depicts examples of structured grids and unstructured grids, in accordance with aspects of the present disclosure.

An alternative approach to a structured grid is to construct unstructured grids, for example, using super-pixel/voxel algorithms, where the grids are constructed based on a certain similarity measure(s). Unlike their structured counterparts, unstructured grids can have non-uniform sampling and irregular shaped subsets for an input attribute and might vary in space. Turning to FIG. 6, this figure illustrates the difference between structured grids 120 and unstructured grids 122. In particular, a structured grid approach is depicted with respect to reference number 120 where structured grids of the same size are overlaid with rectangle boxes. Different box sizes correspond, respectively, to O1 locations (i.e., FS regions), O2 locations (i.e., AVO regions), and O3 locations (i.e., LAC regions). Conversely unstructured grid approaches are depicted by reference numeral 122 at three different level of granularity (leftmost—fine; center—medium; and rightmost—coarse). Only unstructured grids for O2 are shown for clarity. Different colors or grayscale intensities represent different grids. Nearby pixels with the same color or grayscale intensity are assigned to the same unstructured grid. The advantage of using unstructured grids is to match the grid boundaries to the natural spatial boundaries within the data.

Once grids are generated, all configurations among all the grid cells may be evaluated based on the template graph 110. Unlikely configurations based on the geocontextual rules provided by the expert are removed from consideration. For instance, in the example shown in FIG. 5, all four objects ({O1, O2, O3, O4}, n=4) are connected to each other without forming any loops (i.e., a tree-structured graph). There are a total of $n^{n-2}=16$ distinct tree structured graph possibilities. In this example, only the one where selected edges ({$e_{12}$, $e_{13}$, $e_{34}$}) are present is of interest. Moreover, any comparative rule provided by the expert that defines the properties of each of these edges may be considered. As described in the parameter file section, these comparative rules constrain further the set of feasible configurations. Consequently, any configuration that does not satisfy the constraints of the template graph 110 may be eliminated in the preprocessing step 116.

Turning back to FIG. 4, after all feasible configuration hypotheses are generated, the inference engine 96 reasons them with a confidence score using graphical modeling routine or module 130. As used herein, graphical modeling is a probabilistic modeling approach for analyzing complex problems in the presence of uncertainty. Intuitively, a complex system is interpreted by its simpler unit objects. Interaction between the objects is captured by a graph theoretic representation of the data, where graph structure can be learned with unsupervised pattern recognition techniques or be provided by experts as a model directly. The probability theory provides a unified and consistent formulation of the way each of these objects is connected to each other.

With respect to the use of geocontextual graphical modeling as discussed herein, the general Bayesian approach assumes the observed measurements, such as seismic attributes, are generated samples from an underlying probability distribution. In certain implementations discussed herein, such an approach is adopted (due to its ease to incorporate expert knowledge as priors in the probabilistic framework) and used to propose a computational framework to identify complex geo-objects from seismic data using graphical models (such as at graphical modeling step 130). In one implementation, the configuration of the geo-object that needs to be identified is referred to as C and the observation may be referenced as M. According to Bayes' rule:

$$P(C|M) = \frac{P(M|C)P(C)}{P(M)} = \frac{P(O|C)P(C)}{\sum_{C_k \in H} P(O|C_k)P(C_k)} \quad (1)$$

where H is the configuration space. A configuration consists of a set of model parameters $\theta$ and N number of objects O={O1, O2, ..., ON}, where O is the set of objects. Let L={$l_1$, ..., $l_N$} denote the locations (2D or 3D coordinates) of the objects. The posterior distribution defined in Equation 1 can be rewritten as:

$$P(L|M,\theta) \propto P(M|L,\theta)P(L|\theta) \quad (2)$$

where P(M|L, $\theta$) is the likelihood function that measures how likely it is that the observations are obtained given that objects are present at some locations and $P(L|\theta)$ is the prior distribution that objects occur at particular locations. It is in the prior distribution that the contextual rules among objects are encoded, for example, O1 should be above O2. These rules can be provided by experts via the model file, for example, or can be learned from data in a training session.

In this example, the model parameters are defined to be $\theta=(\tau, E, w)$, where $\tau=\{\tau_1, \ldots, \tau_N\}$ are parameters associated with simple rules and are sometimes referred as appearance parameters because simple rules define how each object looks, $E=\{e_{ij}\}$ is a symmetric matrix that indicates the connectivity among objects, and $w=\{w_{ij}|e_{ij}=1\}$ are the edge weights that represent the significance of the comparative relationships between objects. FIG. 5 illustrates an example graph with 4 objects.

According to a graphical model, the distributions can be factored to model the geocontextual relationships. In one embodiment, a Markov Random Field (MRF) model can be used, in which case the likelihood function can be factored as:

$$P(M|L,\theta) = \prod_{C \in \mathfrak{C}} P_C(M|L_C, \theta_C), \quad (3)$$

where $\mathfrak{C}$ denotes the set of cliques of the graphical model (a clique is a subset of objects such that there exists a link between all pairs of objects within the clique) over the objects in a configuration C, $P_C$ are the distribution functions defined over the cliques, and $L_C$ and $\theta_C$ are the set of locations and model parameters restricted to the objects within the clique. The clique relationships can be determined, for example, from the comparative rules. And, accordingly, the prior distribution can be written $$P(L|\theta) = \prod_{C \in \mathfrak{C}} P_C(L_C|\theta_C). \quad (4)$$

In this representation, the graphical model can model relationships between objects of any order; that is, single objects, pairs of objects, triplets, quadruplets, etc.

Combining equations, the posterior distribution is $$P(L|M,\theta) = \prod_{C \in \mathfrak{C}} P_C(M|L_C, \theta_C) P_C(L_C|\theta_C). \quad (5)$$

For modeling or ranking of configurations, one can solve an equivalent, dual formulation of Equation 5 using the Gibbs potential, $$U(L|M,\theta) = \sum_{C \in \mathfrak{C}} U_C(M|L_C, \theta_C) + \sum_{C \in \mathfrak{C}} U_C(L_C|\theta_C). \quad (6)$$

where U are potential functions corresponding to the distribution functions.

Adopting a suitable graphical model, and as considered in the examples, a tree-structured Markov Random Field may be used to model the prior distribution of configurations. The tree-structure simplifies the graphical model by considering only pairwise relationships, and thus Equation 4 can be rewritten as:

$$P(L|\theta) = P(L|E,w) = \prod_{(o_i, o_j) \in E} P(l_i, l_j | w_{ij}). \quad (7)$$

This, in turn, yields the posterior distribution to be maximized:

$$P(L|M,\theta) = \prod_i^N P(M|l_i, \tau_i) \prod_{(o_i, o_j) \in E} P(l_i, l_j | w_{ij}). \quad (8)$$

As before, the dual problem can be solved, in which one can minimize the Gibbs potential to maximize the posterior distribution defined in Equation 8. Note that the first term on the right-hand side of Equation 5 captures appearance likelihoods of individual objects, whereas the second term is related to the relative positions of objects. Consequently, this dual formulation allows the simple ($U_1(L)$) and comparative ($U_2(L)$) potentials to be defined:

$$U(L) = U_1(L) + U_2(L) = \sum_i^N V_1(l_i) + \sum_{(o_i, o_j) \in E} V_2(l_i, l_j | w_{ij}). \quad (9)$$

Here $V_1$ and $V_2$ stand for simple and comparative terms defined for N objects. There are different ways to compute the simple and comparative terms, but intuitively these terms are a measure of how similar or dissimilar a configuration is to the given graph template 110 and are used as a measure of confidence in the reasoning.

The posterior distribution model of Equation 2 characterizes context by the way it defines the dependence on the spatial location of the object and their interactions. By explicitly including and accounting for the dependence on L, the proposed model allow multiple spatial configurations to be evaluated. Additionally, the model of Equations 3 through 5 can also be used in the case where objects depend on the model output at other locations. In that case the model can also allow for geocontextual constraints to be directly imposed during the evaluation of configurations. The addition of this dependency may be useful, for example, in accounting for materiality (i.e., size of the prospect) or different scales in the evaluation of configurations. The geocontextual constraints on output objects may also be useful in increasing the robustness of the ranking process to noise in the input attributes.

Given $V_1$, $V_2$, and the model parameters $\theta=(\tau, E, w)$, the potential function of Equation 6 can be evaluated for any configuration. If the objects are defined only on the input attributes, then the best configuration with respect to any given object can be determined by evaluating all possible configurations referencing that object and determining the configuration with the smallest potential (i.e., maximum posterior probability). In the more general case of Equations 3 through 5, the additional dependencies between objects can couple the evaluation of different configurations. This happens because, in evaluating one configuration, one might depend on the evaluation output from another configuration which, in turn, depends on the evaluation output of the current configuration. To resolve these circular dependencies, a number of strategies may be employed, such as loopy belief propagation, variational methods, or stochastic sampling methods (e.g., Markov Chain Monte Carlo).

With the foregoing explanation in mind, the following case study of a DHI analysis using an expert system is provided by way of illustration. In this study, the present approach was tested on a case where multiple Direct Hydrocarbon Indicator (DHI) volumes were interpreted based on a set of expert provided geophysical rules. DHI attributes are geophysical measures that can be used to identify hydrocarbons directly from the seismic data. In others words, DHI attributes are measurements which may indicate the presence of a hydrocarbon accumulation. Common attributes include: (1) Amplitude versus Offset (AVO): which refers to variation in seismic reflection amplitude with change in distance between the seismic source and receiver (the offset). AVO analysis is often used by geophysicists to determine a rock's fluid content, porosity, density or seismic velocity; (2) Flat Spot Response (FS): which appears as a horizontal reflector in the seismic image and can indicate the presence of a subsurface hydrocarbon contact (e.g., oil/water contact); and (3) Lateral Amplitude Contrast (LAC): which is the difference in amplitude between a reservoir and the surrounding sediments (above, below and laterally), which either are not sands (namely they are silts or shales) or are still sands but they are not hydrocarbon saturated.

Figure 8:
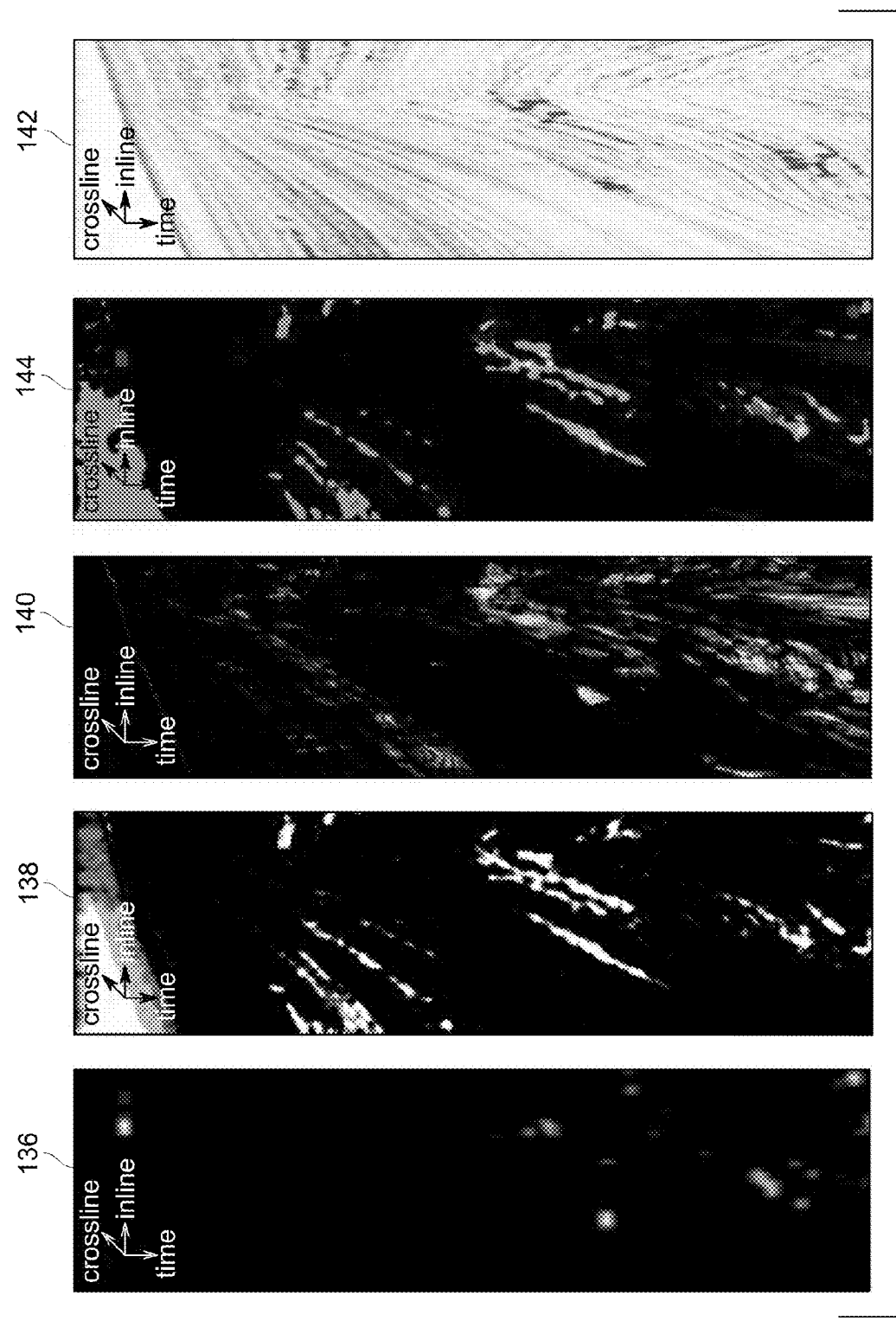
FIG. 8 depicts sample slices from DHI attribute volumes, in accordance with aspects of the present disclosure.

With respect to this case study, FIG. 8 shows sample slices from 3 different DHI volumes 136, 138, 140 and the raw seismic volume 142. Input DHI attributes are (from left to right): FS (slice 136), AVO (slice 140), and LAC (slice 142).

Each DHI is within [0 1] range, meaning 1 is high and 0 is low. RGB map 144 displays these 3 attributes as a single color image, i.e. FS in a first color or intensity channel, AVO in a second color or intensity channel, and LAC in a third color or intensity channel. In one implementation the RGB map 144 may be obtained by assigning each probability map to a separate color (ort intensity) channel, i.e. FS assigned to red, AVO assigned to green, and LAC assigned to blue. Probability maps may be thresholded to improve visibility. Finally, on the right is the raw seismic image 142. Each volume in this example has size of: 1276×401×476 in time, inline, and crossline directions respectively. The user in this study prepared 2 input files: i) a model file 84 that captures geophysical context and ii) parameter file 86 that has system parameters.

In this study, the goal was to find seismic anomalies with Class 2 AVO, and the model file 84 was constructed accordingly. By way of explanation, the class 1 AVO response (higher-impedance gas sand) has a peak at zero-offset that deceases with offset and may change polarity at far offset. A class 2 AVO response (a near-zero impedance contrast) has a weak peak that decreases with offset with a polarity reversal at far offset, or a weak trough that increases in amplitude with offset. A class 3 AVO response (lower-impedance gas sands) has a trough at zero offset that brightens with offset. Finally, a class 4 AVO response (lower-impedance gas sands) has a trough that dims with offset.

In this example, the expert inputs a model file 84 (Table 4) that encodes a general guideline of finding such anomalies in seismic images. In this example, the geocontextual rules include: FS should be below AVO and LAC can be either above or below FS. To encode this guideline into the computational model, the expert first defines that the model should consist of configurations with 3 objects (nodes in the graph): O1, O2, and O3. The expert then specifies 3 simple rules: "O1 has HIGH FS", "O2 has HIGH AVO", and "O3 has HIGH LAC". Intuitively, these rules assign semantic meanings to the objects, i.e., O1 is the FS anomaly region, O2 is the AVO anomaly region, and O3 is the LAC anomaly region. The expert also specifies two comparative rules: "O1 BELOW O2" and "O3 ABOVE-or-BELOW O1", which encodes the spatial relationship among the objects—i) FS response should be below of AVO and ii) LAC response can be either above or below of FS.

TABLE 4

| Sample model file for three DHI objects |
|---|
| #list of DHI attributes; space separated |
| Attributes: FS AVO LAC |
| #List of objects in configuration |
| Objects: O1 O2 O3 |
| #number of simple rules |
| NUM_SIMPLE: 3 |
| #list of simple rules in the format: Site has BEHAVE Attribute |
| S: O1 has HIGH FS |
| S: O2 has HIGH AVO |
| S: O3 has HIGH LAC |
| #number of comparative rules between the objects |
| NUM_COMPARATIVE: 2 |
| #list of comparative rules |
| C: O1 BELOW O2 |
| C: O3 ABOVE-or-BELOW O1 |
| # plugins |
| # func FUN = logicalFUN & algebraicFUN |
| F: HIGH = logicalHIGH & algebraicHIGH |
| F: BELOW = logicalBELOW & algebraicBELOW |

TABLE 4-continued

| Sample model file for three DHI objects |
|---|
| F: ABOVE-or-BELOW = logicalABOVE-or-BELOW & algebraicABOVE-or-BELOW |

Figure 7:
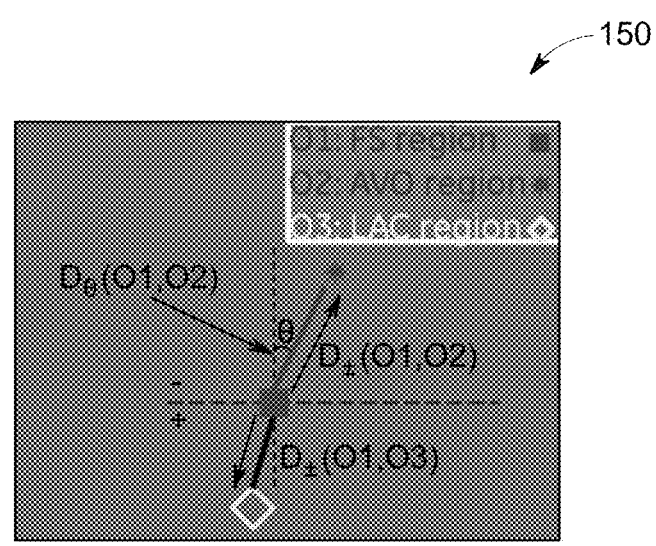
FIG. 7 depicts a configuration template used in a present case study, in accordance with aspects of the present disclosure.

FIG. 7 illustrates the overlaid example template graph 150 that corresponds to the above-mentioned model file 84. In FIG. 7, O1 is represented by a rectangle 152, O2 by star 154, and O3 by diamond 156. The edges between O1 and O2, and between O3 and O1 are constructed from the two comparative rules, represented by line 158 and line 160 respectively in FIG. 7. The length of these edges $D_\pm$ (i.e., lines 158 and 160) can be at most 100 voxels in each time, inline and crossline directions. Note that in this example, there is a one-to-one correspondence between objects (O1, O2, O3) and the input attributes (FS, AVO, LAC). However, as mentioned earlier, it is also possible assign multiple attributes to a single object, e.g. O1 has HIGH FS, O1 has HIGH AVO.

As noted above, in certain implementations the system is designed to potentially run multiple different models 84 in parallel. Further, the model description files 84 can be stored as separate files and may not be part of the main software. One aspect of such an arrangement is that certain proprietary information can be stored in the model description file 84 while the general software system is of generic use, i.e., does not include proprietary information.

With respect to the present case study example, a parameter file 86 containing parameters related to the model and data structure is set as shown in Table 5.

TABLE 5

| Sample parameters file for DHI analysis |
|---|
| WORKSPACE PARAMETERS |
| # Set up the workspace # |
| PATH = /projects/ABC |
| #Name of the current working survey |
| SURVEYNAME = XYZ |
| #Model file name |
| MODELFILE = model.txt |
| MODEL PARAMETERS |
| #Attribute_1 high threshold |
| A1.high = 0.3 |
| #Attribute_2 high threshold |
| A2.high = 0.5 |
| #Attribute_3 high threshold |
| A3.high = 0.5 |
| #maximal spatial distance allowed between any two objects in a configuration when generating possible configurations in time, inline, and crossline directions |
| MaxDistanceToO1= [100 100 100] voxels |
| MaxDistanceToO2= [100 100 100] voxels |
| MaxDistanceToO3= [100 100 100] voxels |
| #maximal 1 - cos distance allowed between any two objects in a configuration when generating possible configurations |
| MaxCosDistance ToO1 = 1 |
| MaxCosDistance ToO2 = 1 |
| MaxCosDistance ToO3 = 1 |
| DATA PROCESSING PARAMETERS |
| #Region of interest to be processed: a vector of length 2*D, where |
| D is the dimension of the input DHI attribute map (2D or 3D) |
| # [Time-end Xline-start Xline-end Inline-start Inline-end], in pixels |
| ROI = [1 1276 1 401 1 42] |
| #number of input dimension |

TABLE 5-continued

Sample parameters file for DHI analysis

```
DIM = 3D
#configure the first DHI attribute
#size of the structured grid: a vector of length D
A1.grid_size = [7 7 7]
#configure the second DHI attribute
A2.grid_size = [9 9 9]
#configure the second DHI attribute
A3.grid_size = [11 11 11]
#Sign of the water surface. True: positive(red) False: negative
(blue)
WS = True
#input file type
INPUTTYPE = SEGY
#Switch for dipping angle estimation -- functions only for 3D
data
DIPPING = 0
DIPPINGVOLUME = \tangentialVolume.vol
#Visualize the selected configurations
VIZ = True
#Write results to disk
SAVEFILE = True
```

Additional data processing parameters include, but are not limited to, WS: polarity of the water surface, type of the volumetric input files, flag to set if dipping directions are used in the estimations (explained below), dipping volume location on the hard drive, visualization flag, and option to save generated files to hard disk. An additional input model parameter is the maximal cosine distance threshold which is used to define one of the comparative terms for the inference and which is explained below.

The model 84 description language may contain certain scalar parameters (e.g. a given threshold or distance). In certain embodiments, these parameters may be hand-picked or assigned. Rather than optimizing over the set of parameters the system 80 may be designed to run the model 84 over certain parameter ranges. For example: A given model contains parameters T1 and T2. Rather than running the model with the given parameters the system 80 runs the model over a range [T1–D1, T1+D1] as well as [T2–D2, T2+D2]. Computing the model over an entire range of parameters has several advantages. First, it may be possible to evaluate how stable certain detections are. For example, in case a particular detection is only generated with one particular parameter setting it is likely that this is a spurious detection and should therefore be discarded. In this way the system 80 can illustrate the sensitivity of parameter settings.

As discussed above, the proposed system 80 takes expert-defined geocontextual model file(s) 84, a set of attributes (input data) 82, and parameters 86 related to both model(s) 84 and attribute(s) 82 as input. The system 80 then generates configurations as possible candidates with some confidence score (see FIG. 4). In one embodiment, the inference engine 96 computes the confidence score for each hypothesized configuration according to the likelihood function defined in Equation 5 (and its dual form in Equation 6).

For the abovementioned example model, in order to evaluate the cost function defined in Equation 6, the inverse of the harmonic mean of component likelihoods:

$$U_1(L) = \frac{1}{\sum_{i}^{N} P(O \mid l_i, \tau_i)}$$

was used for the simple term. Other measures, e.g. the sum of negative log-likelihoods, could also be utilized for this term. In order to define comparative terms, the signed Euclidean, $D_\pm$, and the cosine distance, $D_\theta$, were evaluated between objects. The motivation to estimate $D_\pm$ and $D_\theta$ is to capture spatial relationships between objects and their orientation. Signed Euclidean distance is used as a measure of how close are objects in space. Angular displacement is used to define relative position of objects; hence also the sign of the $D_\pm$. For example, as illustrated in the previous model parser example (see FIG. 7), 3 objects (θ1, O2, O3) are related to each other with 2 comparative rules: "O1 BELOW O2" and "O3 ABOVE-BELOW O1". Assuming images are in lexicographical order such that the top left of an image is origin (0,0,0) and index along inline, time, and crossline axes increases: i) from left to right, ii) from top to bottom, and iii) from upward to inward correspondingly, the first rule dictates that the spatial position of O2 in time (vertical) axis is smaller compared to O1. Similarly, the second rule implies that O3 can be above or below O1, but not likely to the sides. To evaluate the angle between the object pair and the time axis, the cosine distance is estimated using the inner product between the unit length object displacement vector, $v_{ij}=(l_i-l_j)/|l_i-l_j|$, and unit length time axis basis vector and given as:

$$D_\theta = \theta_{ij} = 1 - (\langle e_t, v_{ij} \rangle) = 1 - ([0\ 0\ 1]^T(l_i-l_j)/\|l_i-l_j\|) \quad (7)$$

Here time axis ($e_t$) is used as a reference orientation. Thus, any obtuse angle ($\theta_{ij} > 90$) results in a negative sign and hence negative Euclidean distance implying that $l_i$ is above $l_j$ with respect to the time axis. Consequently, a positive sign defines a below relationship. Moreover, one can also use $\theta_{ij}$ to define side relationship as well, ($|\theta_{ij}-90|<\epsilon$), where $\epsilon$ is a user defined threshold.

Figure 9:
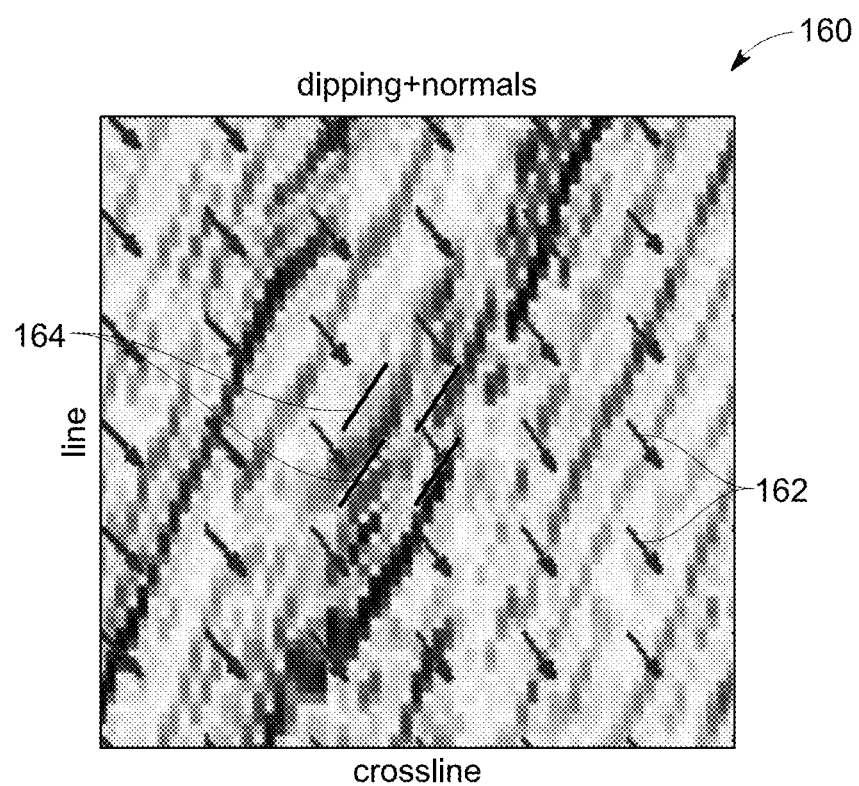
FIG. 9 depicts a 2D slice of a seismic volume showing both dipping and surface normals, in accordance with aspects of the present disclosure.

Here, the reference orientation was defined as the time axis. One can also use any arbitrary direction as a reference with the outlined approach. For example, one can use dipping direction as the orientation to define spatial relationships. With this in mind, FIG. 9 shows a 2D slice 160 of a seismic volume, where dipping and surface normals are overlaid on the gray and color scale images. In this example, the arrows 162 (heading downwards and to the right) are the normal directions and the lines 164 (slanted downward and to the left) are the dipping directions. One advantage of having flexibility with respect to the orientation is that this allows interpretation of events in a local geophysical coordinate system that is related to geological age.

Based on the above discussion, accumulative comparative potential between objects, O={O1, O2, . . . ON}, is estimated as $U_2(L) = \Sigma_{(O_i,O_j) \in E}(\lambda_1 D_{Euc} + \lambda_2 D\theta)$, where $D_{Euc} = \|l_i - l_j\|$. Here, each term was weighted with λ (a user specific parameter that defines the scale and the importance of the contributing terms). Final potential can be rewritten in terms of individual potentials as follows:

$$U(L) = U_1(L) + U_2(L) = \lambda_0 \sum_{i}^{N} \frac{1}{P(O \mid l_i, \tau_i)} + \sum_{(o_i,o_j) \in E} \lambda_1 D_{Euc} + \lambda_2 D_\theta \quad (8)$$

Figure 10:
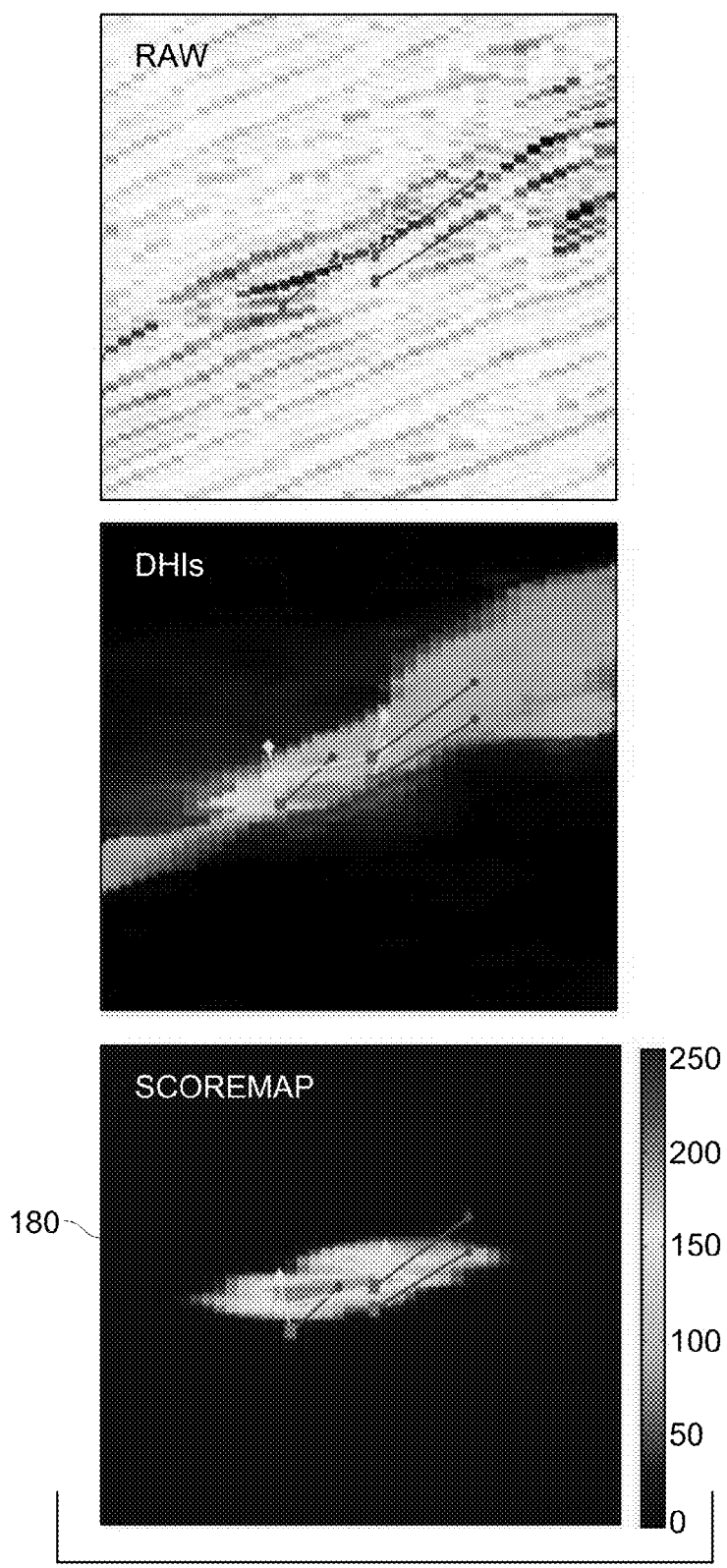
FIG. 10 depicts multiple candidate configurations from a cluster, in accordance with aspects of the present disclosure.
Figure 11:
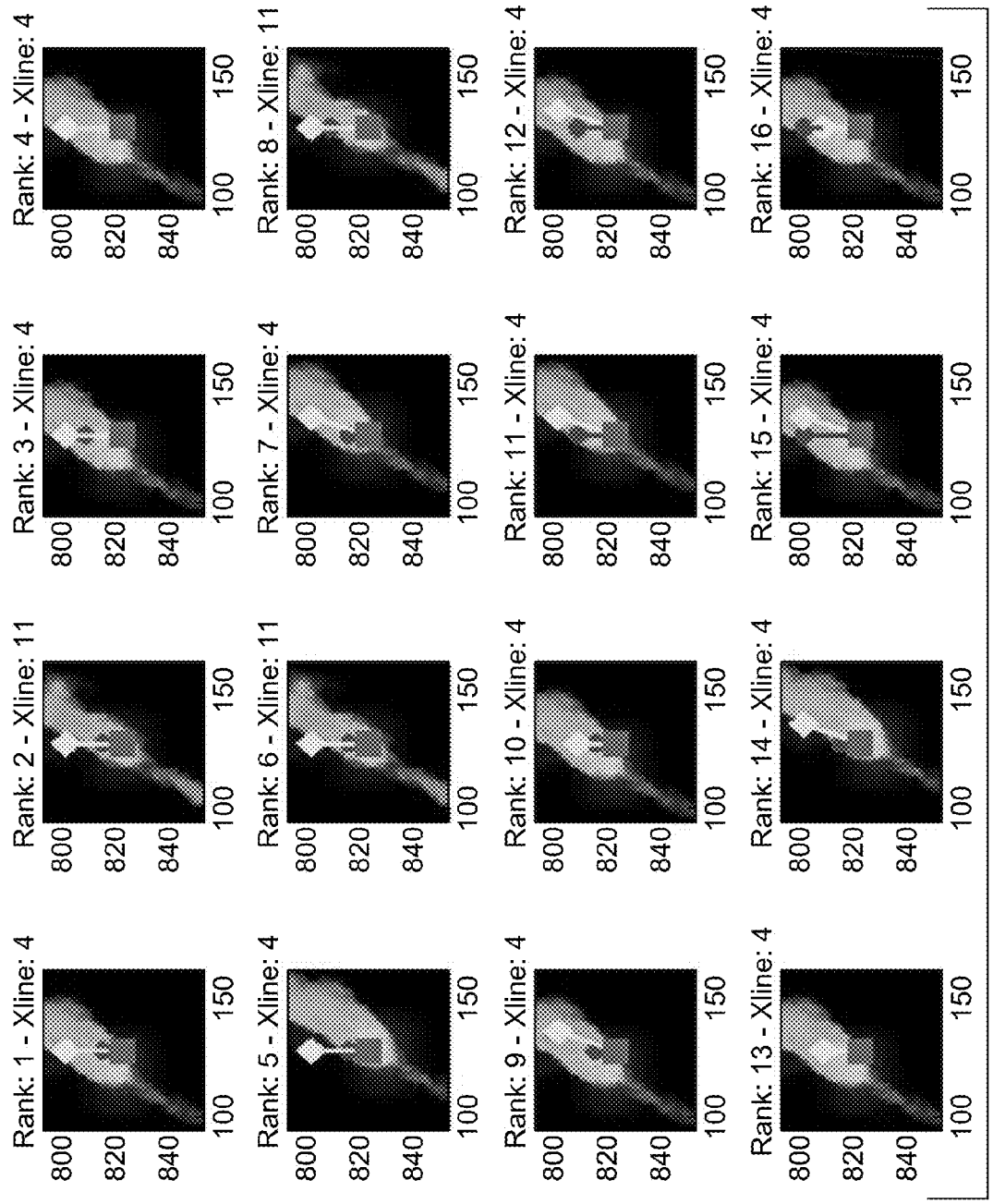
FIG. 11 depicts ranked configurations around the highlighted region of FIG. 10 using a first set of system parameters, in accordance with aspects of the present disclosure.
Figure 12:
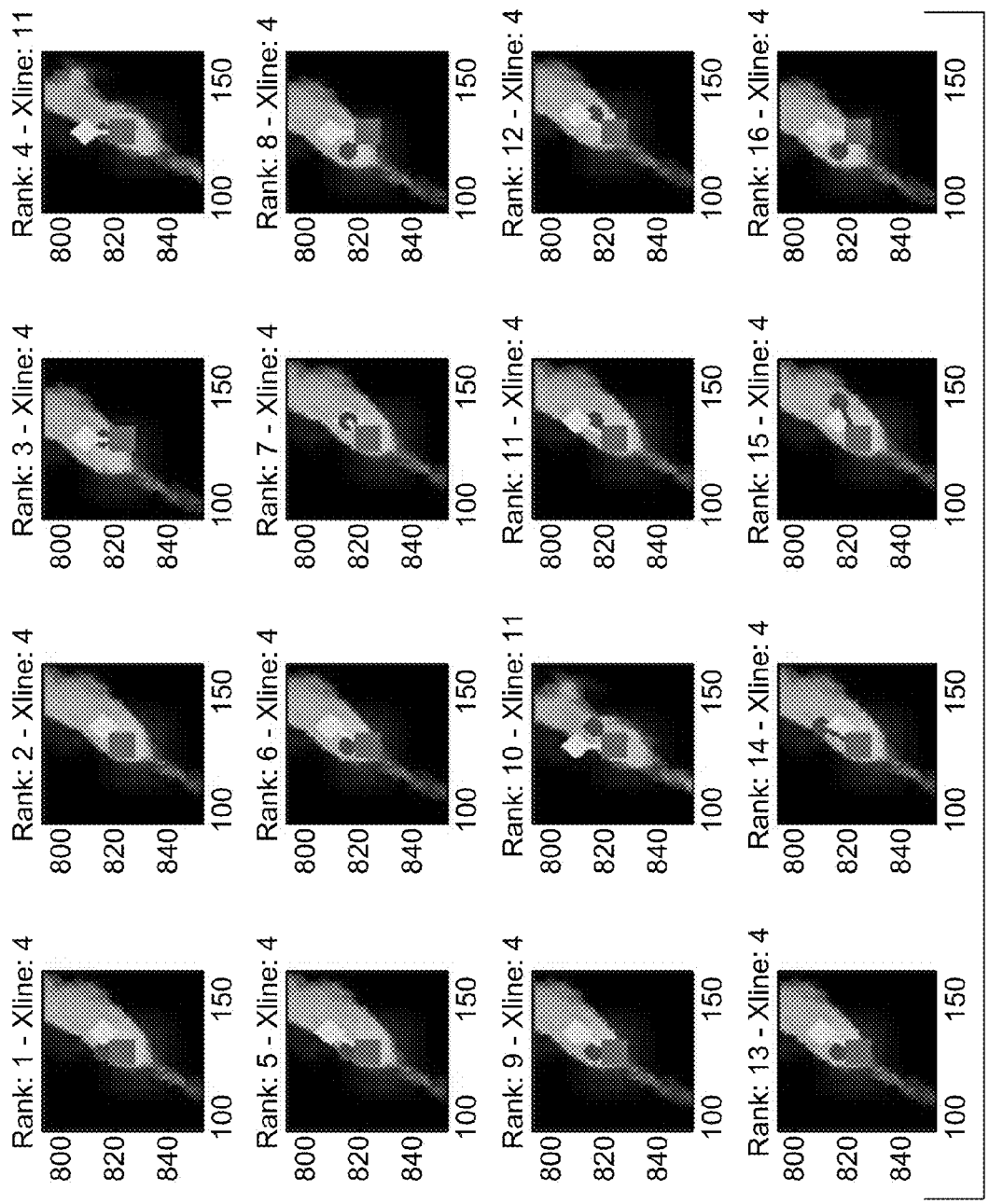
FIG. 12 depicts ranked configurations around the highlighted region of FIG. 10 using a second set of system parameters, in accordance with aspects of the present disclosure.

With the foregoing discussion in mind, certain aspects related to postprocessing is now discussed. One such postprocessing aspect is clustering. When the sampling grid size is small, there could be multiple configurations within a small neighborhood region. By way of example FIGS. 11 and 12 show some of the ranked configurations (using arbitrary selected system parameters in Equation 8) around the neighborhood illustrated in FIG. 10. FIG. 10 in turn depicts multiple candidate configurations from a cluster overlaid on A) raw seismic data, B) an RGB-DHI image, and C) an estimated scoremap. Highlighted regions correspond to regions that have high likelihood of having similar characteristics outlined in the model file.

Time (y axis), inline (x axis), and crossline (Xline title at the top) show the location of each configuration. In order to show the effect of comparative parameter selection, FIGS. 11 and 12 show two extreme cases where the configurations obtained using a low parameter set value ($\lambda_0$=0.1 $\lambda_1$=0.0001 $\lambda_2$=0.1 $E_1$=25 $E_2$=0.1) are displayed in FIG. 11 and conversely the configurations using a higher value set ($\lambda_0$=10 $\lambda_1$=10 $E_1$=125 $E_2$=1) are depicted in FIG. 12. Each figure shows the first 16 configurations based on the selected parameter set. For this experiment, 0.5 was used as the high threshold (A{1,2,3}.high=0.5) and (9×9×9) voxels as the lattice size for all input attributes. Notice that first selection constrains configurations to have smaller distances between objects and aligns object pairs with the time (y-axis in FIG. 11) direction, whereas, objects are more spread horizontally in the second parameter set. Configurations are similar in geometry. In contrast to FIG. 11, objects spread more, e.g. Rank-15 in the example depicted in FIG. 12. Each configuration is sorted in rank based on the score evaluated based on Equation 8.

In order to help the user effectively explore the entire seismic volume, the configurations may be clustered based on their spatial proximity—e.g., configurations within a user-defined distance threshold are assigned to the same cluster. Note that a configuration consists of different objects. For the given example, the spatial location of object O1 (the region that has high flat spot response) is taken as the spatial location of the configuration. In one implementation, the representative configuration (e.g., the highest ranked one) of a cluster may be presented to the user for visual inspection and annotation. Meanwhile, for fast user interaction, a KD-tree may be constructed over the location of cluster representative configurations.

Similarly, a scoremap 180 may be generated as part of postprocessing. For example, in order to map clustering results to the original data volume, a scoremap 180 of clusters may be estimated. As used herein, a generated scoremap 180 is a measure of the likelihood of regions having similar characteristics outlined in the model file 84. As noted above, FIG. 10 shows a case where candidate configurations from a cluster are overlaid on (A) raw seismic data, (B) an RGB-DHI image, and (C) an estimated scoremap 180. The configuration template displayed in FIG. 7 was used in this example. In one implementation, in order to estimate the scoremap 180, the weighted histogram of all configurations locations is first estimated. Each object location, may be weighted with its corresponding simple term ($U_1(l_i)$), to compensate for the bias in the estimation of the histogram. Note that any large size cluster may dominate the histogram; hence the scoremap response may make it harder to recognize subtle clusters. Other weighting terms, i.e. log-likelihoods, are also possible to weight each histogram bin depending on the application. Finally a Gaussian filter may be applied to smooth out the result.

Further, postprocessing may include a ranking operation 88, as noted above. In one implementation, and in the example depicted by FIGS. 11 and 12, a default setting may be that results are ranked based on the inference engine's scores (e.g., Equation 8). Note that, the problem posed in Equation 8, is a minimization problem, hence, by varying $\lambda$, the shape and characteristic of the configurations found by the algorithm may be controlled. For example, setting a high value for $\lambda_0$ biases the ranking to return configurations having higher attribute response at object locations, or by increasing $\lambda_2$, configurations may be retrieved that are better aligned with the dipping direction. Another mechanism to decide the retrieval characteristic is the comparative thresholds ($E_i$), e.g. MaxDistanceToO1. Note that, $E_i$ defines the search radius of configurations to be ranked, it does not affect the cost itself. By setting a larger $E_i$, the pool of configurations that are ranked based on their score may be enlarged.

Other ranking criteria, such as the spatial extent of the configurations, may also be supported by the system. Supporting multiple ranking criteria may be useful in the deployment of system in a production environment. It allows for situations where different criteria may be desired for different reservoirs or different business problems. For example, potential interesting regions that deserve further expert investigation should be ranked high. The validation of the ranking are discussed below in the results section.

In addition, postprocessing, as depicted in FIG. 3 may incorporate user interaction and online learning. For example, in one study, a dual annotation approach was employed to rank clustered configurations. Estimated clusters were represented by the configuration that had the minimum potential (Equation 8) in that cluster. These representative results were overlaid (see FIG. 10) on raw seismic data, DHIs, and scoremap volumes for qualitative validation and analyzed by an expert as possible hydrocarbon lead candidates. For each candidate, expert annotations were captured in a log file. In one implementation, the inference engine's and expert's input may jointly be used as a feedback to the system for parameter optimization and to update model parameters (FIG. 3, block 92).

Figure 13:
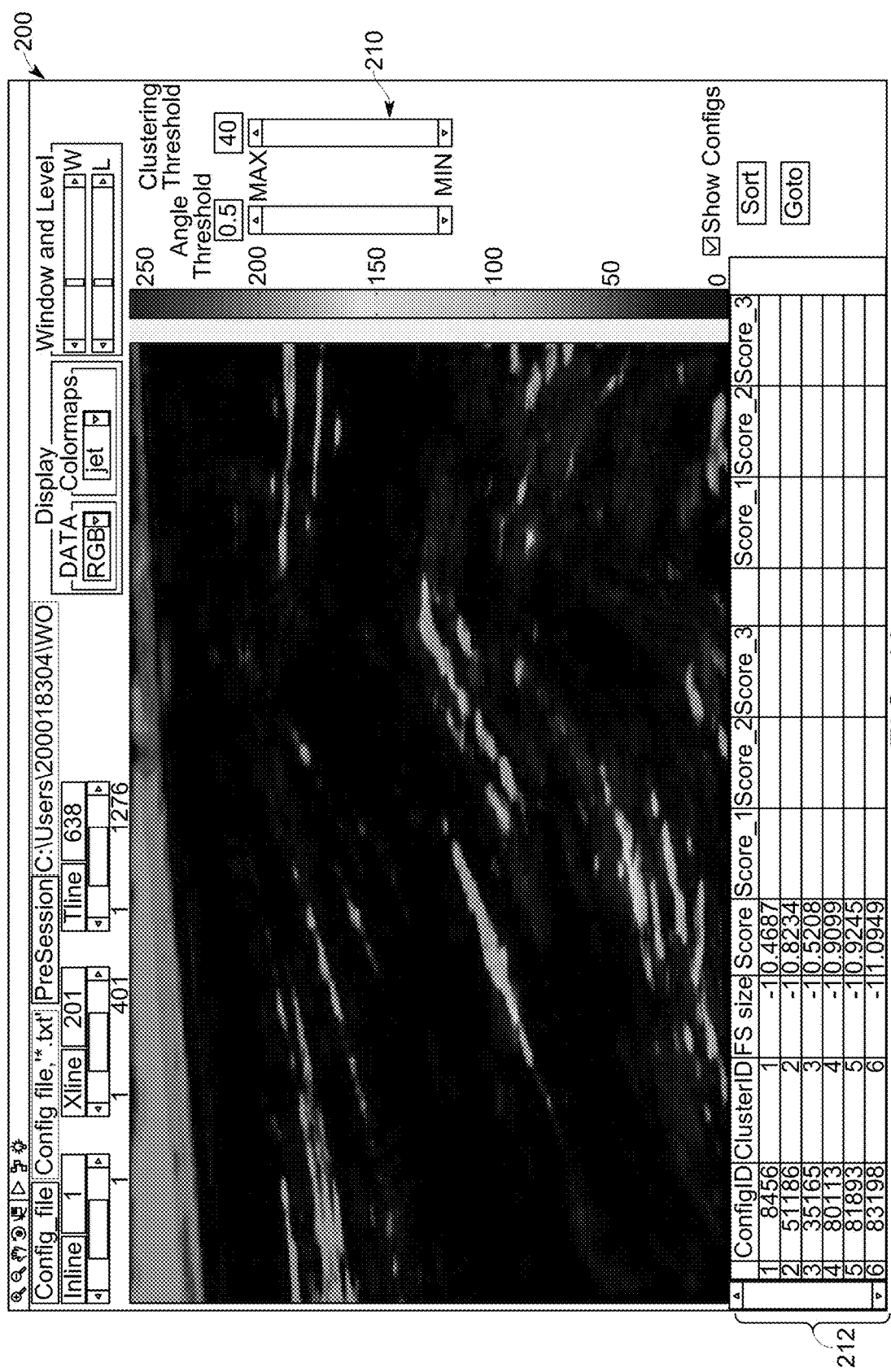
FIG. 13 depicts an embodiment of a graphical user interface (GUI) for use with the system of FIG. 3, in accordance with aspects of the present disclosure.

Turning to FIG. 13, this figure displays an example of a Graphical User Interface (GUI) 200 for use in conjunction with a presently contemplated system 80. The depicted GUI 200 supports 3 main features: (1) 3D browsing and visualization in inline, crossline and time slices; (2) modifications on the inference engine to adjust clustering result; and (3) user interaction. The 3D browsing feature enables a user to visualize 2D slices of the 3D volumes in user defined color or intensity ranges (brightness and contrast) and format (jet, gray, seismic, etc.). Moreover, the depicted GUI 200 supports other viewing options, i.e. zoom in/out, pan, rotate, etc. A user can modify the clustering results by adjusting clustering threshold, such as via slide bar 210. In one implementation, results are ranked based on the inference engine's scores (Equation 8) by default. Other sorting criteria, such as individual potential terms or user defined measures, are also supported by the system. In the depicted example, automated inference engine results 212 are displayed in the bottom table for ranking and interactive annotation.

Figure 14:
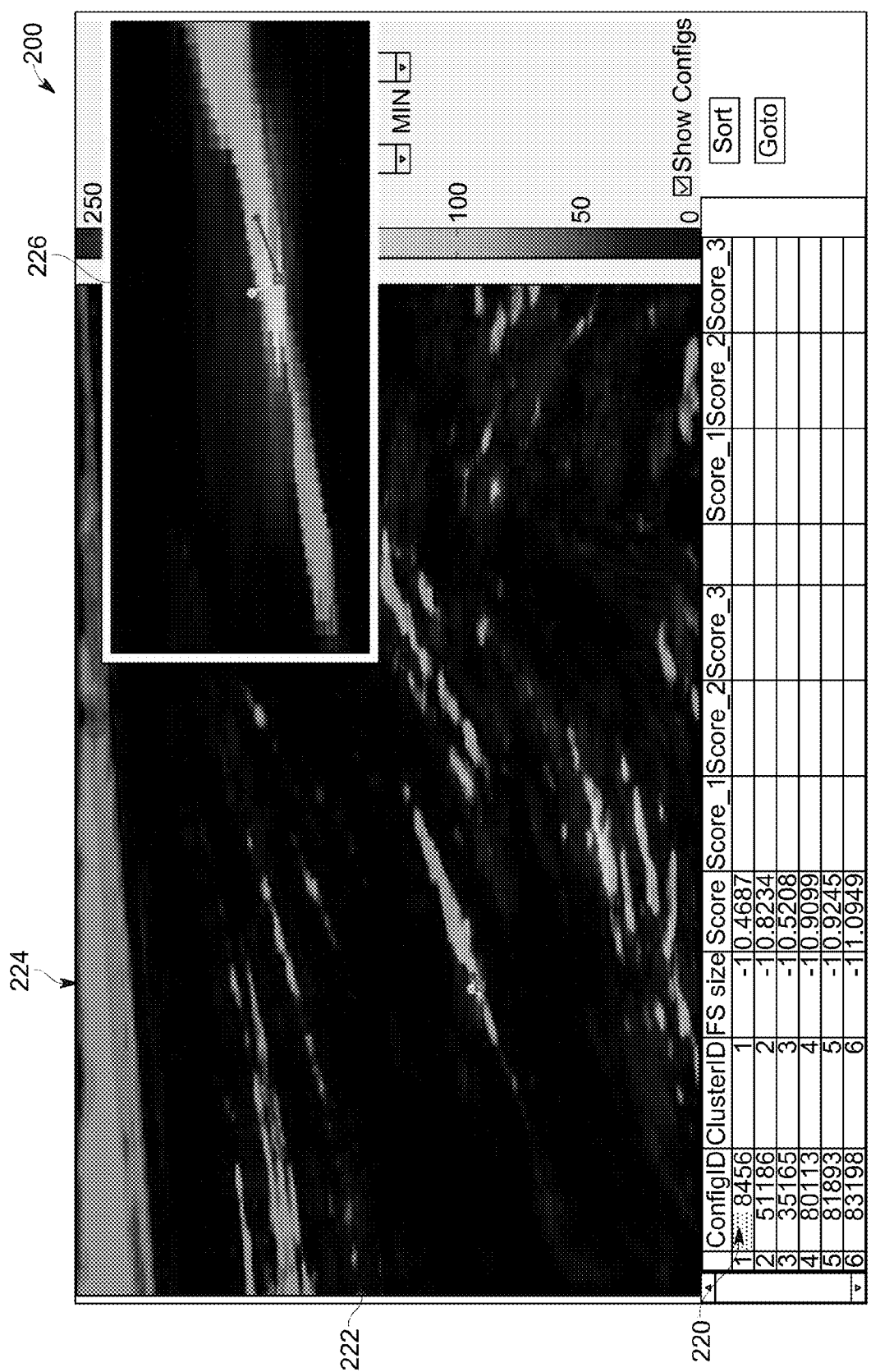
FIG. 14 depicts an overlay and masking operation using the GUI of FIG. 13, in accordance with aspects of the present disclosure.

In addition to modifying a clustering parameter (e.g., slider 210), the depicted GUI 200 supports two-way communication between the inference engine results and expert annotations. For example, FIG. 14 shows a case where the user selected one cluster 220 from the bottom table and the representative configuration 222 for that cluster is overlaid on the RGB DHI image 224. In this example, the selected clustered configuration 220 (the first one in the table) is visualized and the rest is masked. A close-up 226 is displayed on the right top. In one implementation, any cluster can be selected from the table by selecting the corresponding cluster ID (first column) or by directly clicking the configuration on the screen using the cursor feature of the GUI 200.

Figure 15:
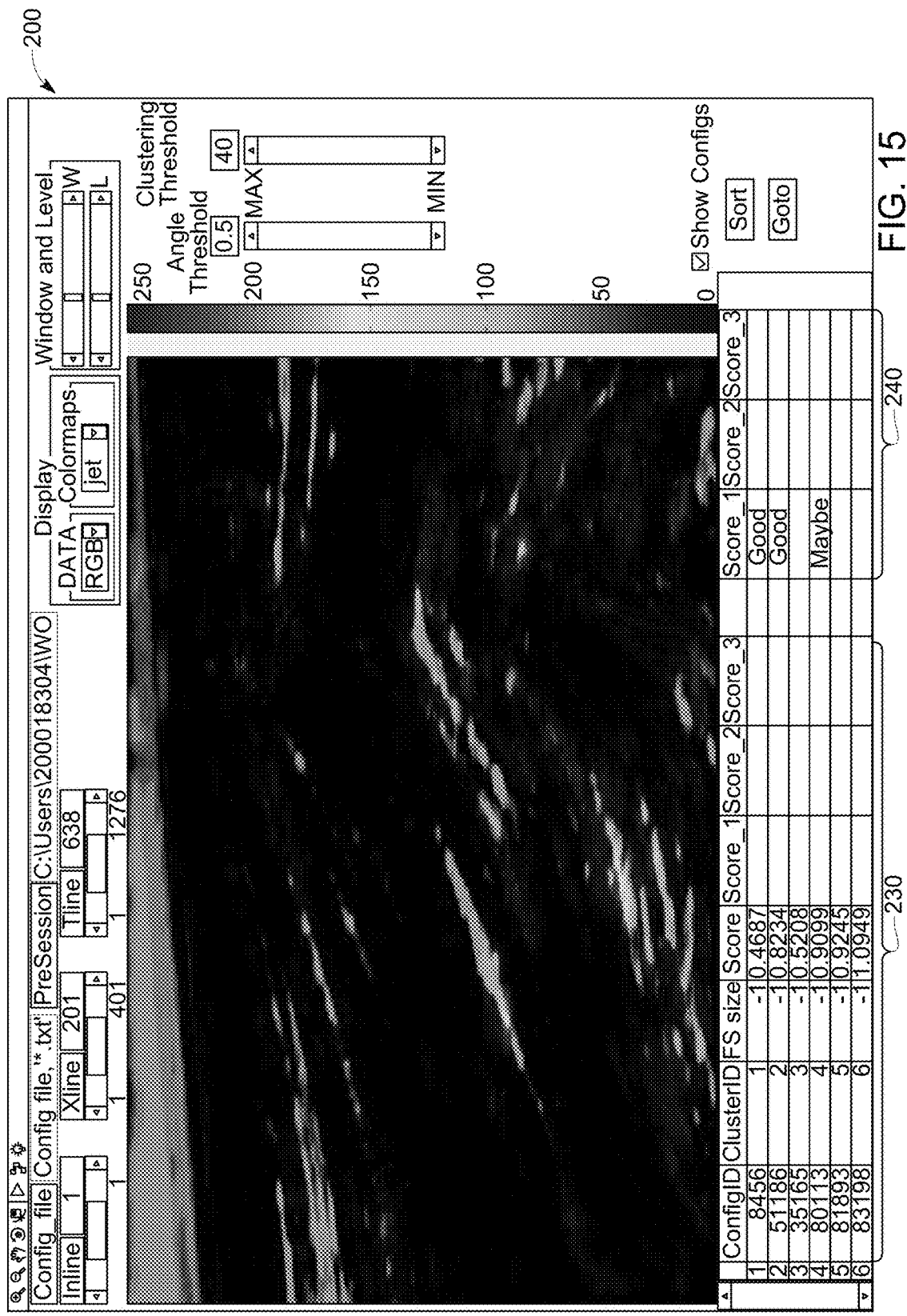
FIG. 15 depicts dual display of automated inference engine results and expert results, in accordance with aspects of the present disclosure.

In one example, for each selected candidate, the system 80 captures expert feedback after the expert qualitative validation and cross-referencing with individual seismic, DHI, and heat map volumes. By way of example, FIG. 15 depicts the proposed dual approach capability of the system 80. Automated inference engine results 230 are displayed on the left, whereas expert entered annotations 240 are displayed on the right.

Since the system 80 can potentially evaluate different models 84 in parallel, different users can collaborate by running various different models 84 and interactively compare the results of these. For example: User A can test a specific model (e.g., Model 1), while User B runs Models 2 and 3 on the same seismic data set 82. In one implementation, the resulting inference results of all three models 84 may be shown in one ranked list. Each user can then review what conditions or structures the respective models 84 detected. Differences in detection results can be highlighted. Given a particular location or structure it is possible to compare the scores of the different models 84.

By way of further example, an additional case study is provided. In this case study, detection of carbonate mounds is described. In particular, use of graphical modeling in the automated detection of carbonate mounds from seismic data is discussed. Carbonate mounds can be of economic interest because they can, in some cases, contain porous lithologies which can serve as hydrocarbon reservoirs. Carbonate mounds can generally be detected in seismic data based on several criteria, though not all are necessarily present or detectable in a specific case, depending on such variables as seismic resolution, surrounding lithologies, fluid fill, mound thickness, areal extent, etc. Detection criteria include high seismic velocities (generally 4000-6000 m/sec), top reflections consistent with increases in impedance, highly dipping margins, mounded, dipping, layered or chaotic internal character, onlapping laterally adjacent strata, reflection thickening relative to adjacent strata, and semi-circular, platform, or irregular shape. Detection of carbonate mounds is a multi-scale problem, in that carbonate mound platforms range from less than 10 km$^2$ to tens of km$^2$ in area extent. In this example, the desired output may be determination of the probability of particular regions within the data being carbonate mounds or classification of data into categories such as: probable carbonate mound, possible carbonate mound, and unlikely carbonate mound.

Graphical modeling, as discussed herein, enables automated detection of carbonate mounds by bringing together attributes from multiple seismic volumes that are related but that are not generally co-located, i.e., the features of interest in one attribute are not in the same location as those of another attribute. That is, seismic attributes capture different geological aspects. Each of the attributes listed above can be represented by one or more simple attributes. Groupings of these occurrences are identified by presence of multiples of these attributes. Groupings are ranked to indicate probability of mound presence. Some criteria, such as presence of high seismic velocities, high impedance top reflection, highly dipping margins, and mounded, dipping, layered or chaotic internal character may be weighted higher due to their having greater diagnostic value, though the rules are adaptable to specific applications. Other criteria, such as base low impedance may be weighted lower, due to their being generally less common or detectable criteria. Rules for incorporating seismic velocities may take into account the fact that velocity volumes generally have significantly lower resolution than seismic reflection volumes, so the location of high velocity interval are "smeared" with respect to those identified in seismic reflection data. High impedance top reflection is an example of a criterion which can be highly diagnostic when coupled with other indicators, but it can be extremely common throughout seismic volumes and not useful in isolation. As a second case study, a sample of a model file for carbonate mound detection is provided below without going through all the computational steps outlined in the DHI case study.

Figure 17:
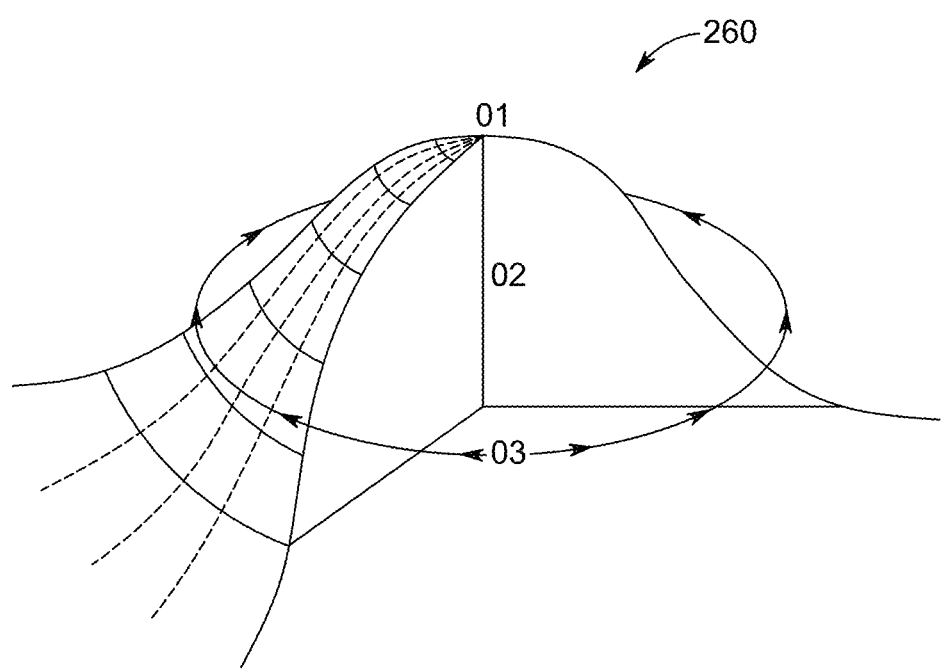
FIG. 17 depicts a 3D view of a carbonate mound showing: i) below-above relationship between O1 and O2, ii) onlapping relationship between O3 and O2.

Model File—In this example, it is assumed that 4 input attribute volumes are available, A1, A2, A3, and A4. User captured simple and comparative information is provided in a model file by first defining each of the objects in terms of attributes, where a schematic, visualization of the relationships between objects is depicted in FIG. 17. In this figure, a 3D view of a carbonate mound 260 shows the relative orientation and positioning of the objects, O1, O2, and O3 with respect to the carbonate mound 260. In this example, an expert determines that A1 is associated with O1, A2 and A3 are high in O2 and O3 has low A4. Here generic naming for attributes is used, hence any attribute that manifests in object regions can be used, e.g. velocity for A2, dipping for A3, or impedance for A4. As noted above, rule definitions, as used herein, are highly flexible to cover a large set of relationships. It is possible to formulize different definitions of "AROUND" as an algebraic function depending on the objects. For example, here O3 circumscribes both O1 and O2. The relationship with the O2 is more similar to coverage in 3D and can be formulated as below or above relation along the direction that is orthogonal to the dipping angle in the O3, whereas the relationship with the O1 is more like an encapsulation in 2D. So, an expert can formulate two separate around rules with their algebraic functions to cover relations between different objects, and define the comparative rules as "O1 ABOVE O2", "O3 AROUND O2", and "O3 AROUND O1". A sample model file for 3 objects having 4 attributes is outlined in Table 6.

TABLE 6

Sample model file for carbonate mound detection list of attributes; space separated
Attributes: A1 A2 A3 A4
List of objects in configuration
Objects: O1 O2 O3
number of simple rules
NUM_SIMPLE: 4
list of simple rules in the format: Site has BEHAVE Attribute
S: O1 has HIGH A1
S: O2 has HIGH A2
S: O3 has HIGH A3
S: O2 has HIGH A4
number of comparative rules between the objects
NUM_COMPARATIVE: 3
list of comparative rules
C: O1 ABOVE O2
C: O3 AROUND_1 O2
C: O3 AROUND_2 O1
plugins
func FUN = logicalFUN & algebraicFUN
F: HIGH = logicalHIGH & algebraicHIGH
F: ABOVE = logicalABOVE & algebraicABOVE
F: AROUND_1 = logicalAROUND_1 & algebraicAROUND_1
F: AROUND_2 = logicalAROUND_2 & algebraicAROUND_2

Results—The proposed system was tested on the dataset described in the case study section. The test set was composed of 3 DHI volumes, where each volume had size of: 1276×401×42 in time, inline, and crossline directions respectively. An expert provided the rule file 84 similar to the one outlined in Table 4. Various $\lambda_i$ and $E_i$ pairs were tested as parameter sets for the input model ($S_i$). Here, $\lambda$ defines the scale and the importance of the contributing terms and E is the threshold used for the comparative terms.

The effect of changing $E_i$ parameter was demonstrated herein in the Ranking section. Here, results obtained by varying the $\lambda_i$ values are reported. The set of parameters used in experiments is as follows (in total 27 distinct combinations):

TABLE 7

Selected parameter values used in the experiments

| Parameter | Values |
| --- | --- |
| $\lambda_0$ | 0.1, 1.0, 10.0 |
| $\lambda_1$ | 0.0001, 0.0316, 10.0 |
| $\lambda_2$ | 0.1, 1.0, 10.0 |
| $E_1 > D_+$ | 75 |
| $E_2 > \theta$ | 1.0 |

Equally sampled $\lambda_i$ values in logarithmic scale were used to cover a large range of values. The experimental setup was as follows:

Two experts scanned the DHI volumes and highlighted interesting regions. Since, FS response constitutes the central object of a configuration, all FS regions having a higher value than the A1.high threshold (the same threshold that was used for inference engine) were initially found. Once the FS response was thresholded, a 3D connected component was applied to get individual components and give a unique label to each of them. Any connected component having less than 5 voxels was deleted as being too small and likely to be missed when a structured grid is constructed. Then, experts went through each of these sufficiently large regions and performed an analysis based on all DHI and raw seismic volumes to give a score from 1 to 5. The score indicated the likelihood of having interesting events in that region (1 being less likely and 5 is highly important). Fleiss' kappa for the reliability of agreement between experts was calculated as 0.2917, indicating fair agreement between the experts.

Then, in order to generate graphical modeling scores, rankings were generated for each of the parameter sets. Since $E_1$ and $E_2$ thresholds were fixed, the total number of configurations obtained for each of the 27 parameter set ($S_{j=1\ldots27}$) was the same. Both $E_1$ and $E_2$ were set to very large numbers to keep the configuration pool rich for the experiments, but in real life scenarios the expert(s) has the ability to set these two parameters based on preference. For each parameter set ($S_1$), all of the configurations were clustered. As mentioned earlier, configurations were clustered based on their spatial proximity. To simplify the clustering process, the label of the respective configurations was defined as the label value at $l_1$ (the spatial location of the first object O1 corresponding to FS). Then, two configurations were clustered together if they have the same connected component label. Each cluster was represented by a representative configuration having the smallest cost function (Equation 8) within that cluster.

Figure 16:
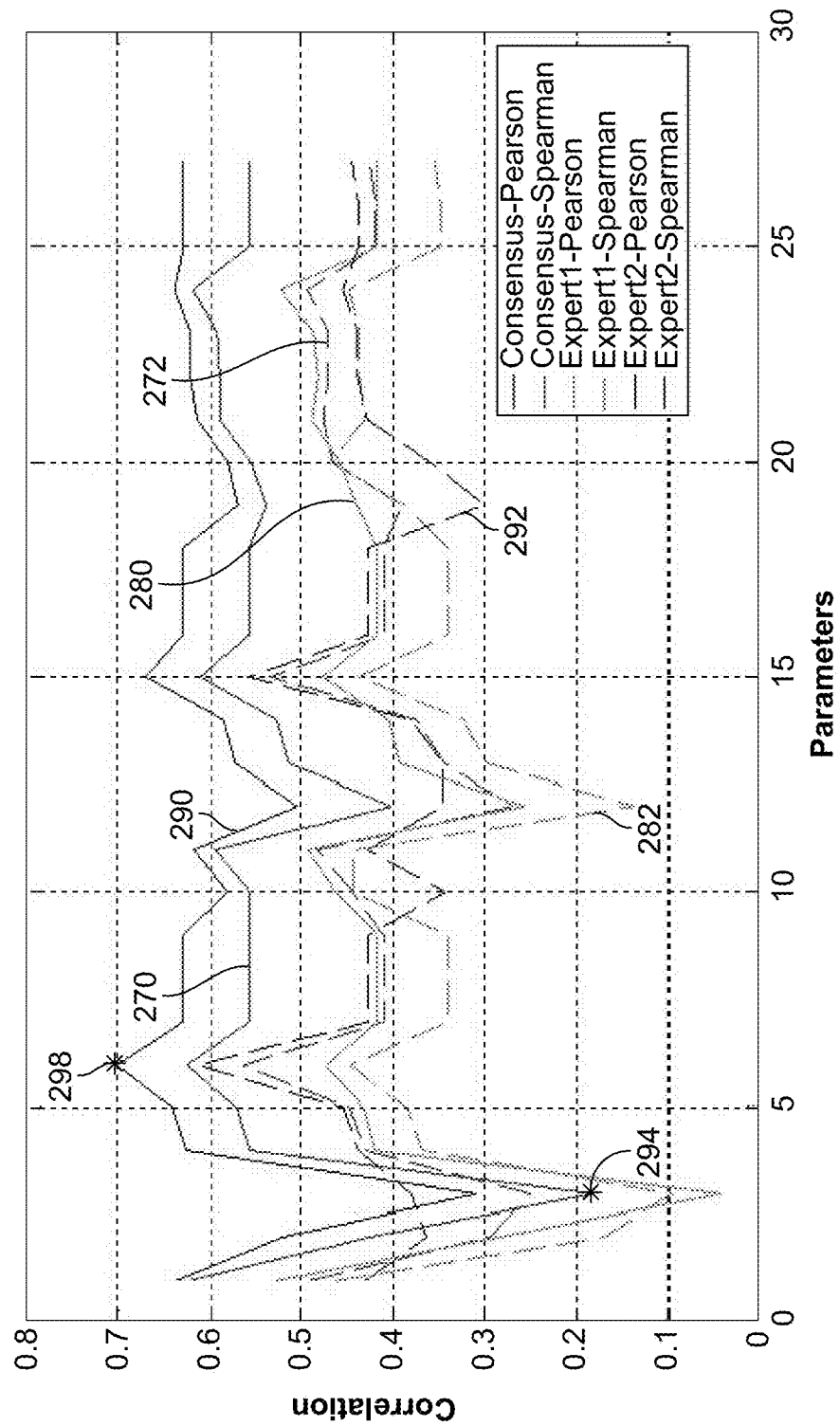
FIG. 16 depicts correlation coefficients describing correlations between ranking of the present system and expert rankings, in accordance with aspects of the present disclosure.

The mean Pearson and Spearman correlation coefficients between the ranking of the proposed system and the expert ranking were calculated and reported in FIG. 16. The difference between these two correlation measures is that, the Pearson coefficient is based on covariance and standard deviation calculation; whereas the Spearman coefficient is based on the ranking itself and can also capture nonlinearities in the relations between sample populations. Such measures provide powerful tools for user interaction and for parameter update mechanisms and can be used to select system parameters to be optimized. In this example, line 270 represents the consensus decision based on the Pearson correlation coefficient, line 272 represents the consensus decision based on the Spearman correlation coefficient, line 280 represents the results for a first expert based on the Pearson correlation coefficient, line 282 represents the results for the first expert based on the Spearman correlation coefficient; line 290 represents the results for a second expert based on the Pearson correlation coefficient, and line 292 represents the results for the second expert based on the Spearman correlation coefficient.

Figure 18:
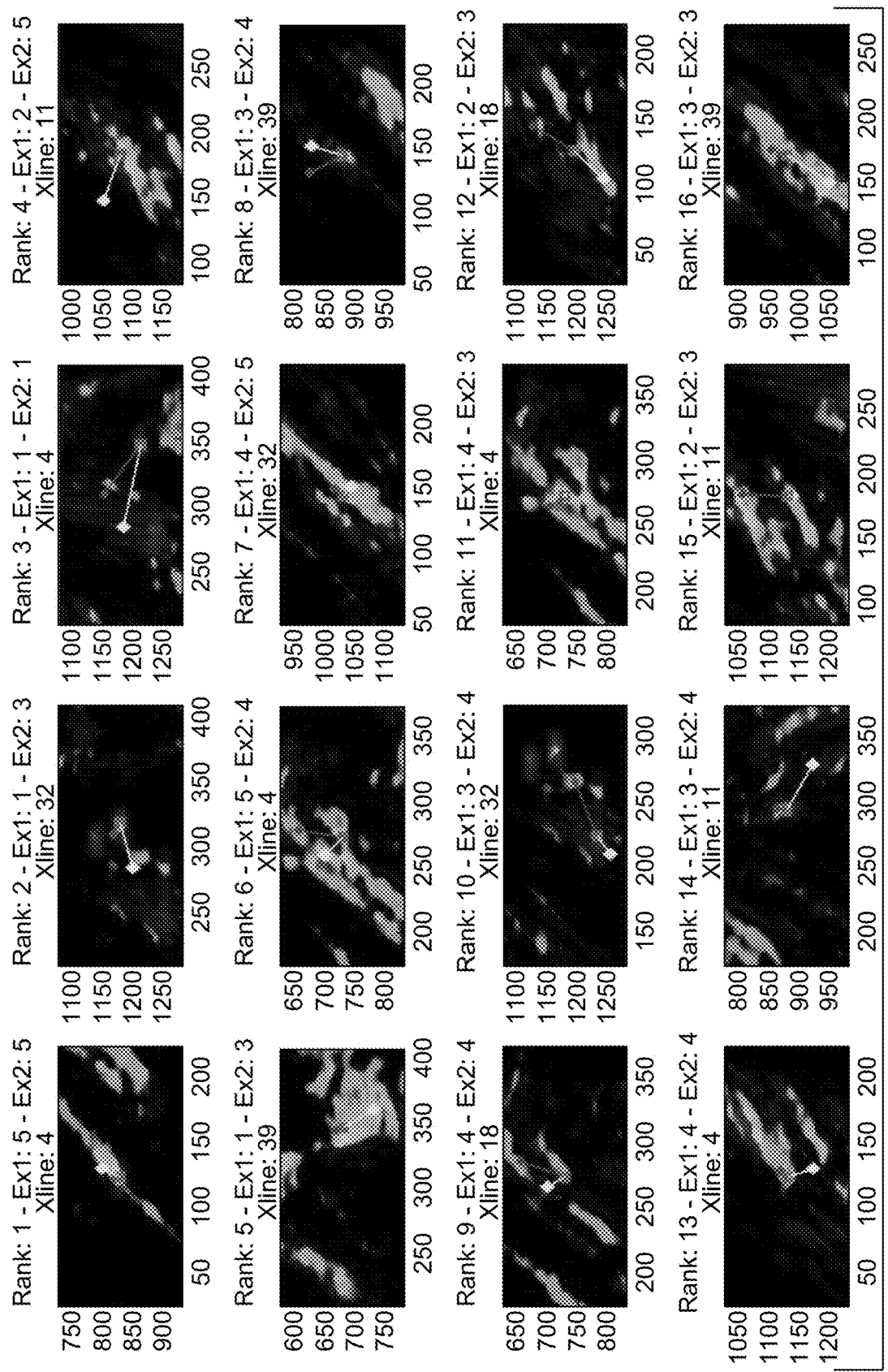
FIG. 18 depicts the first 16 configurations obtained operating at the parameter selections indicated with star 294 in FIG. 16, in accordance with aspects of the present disclosure.
Figure 19:
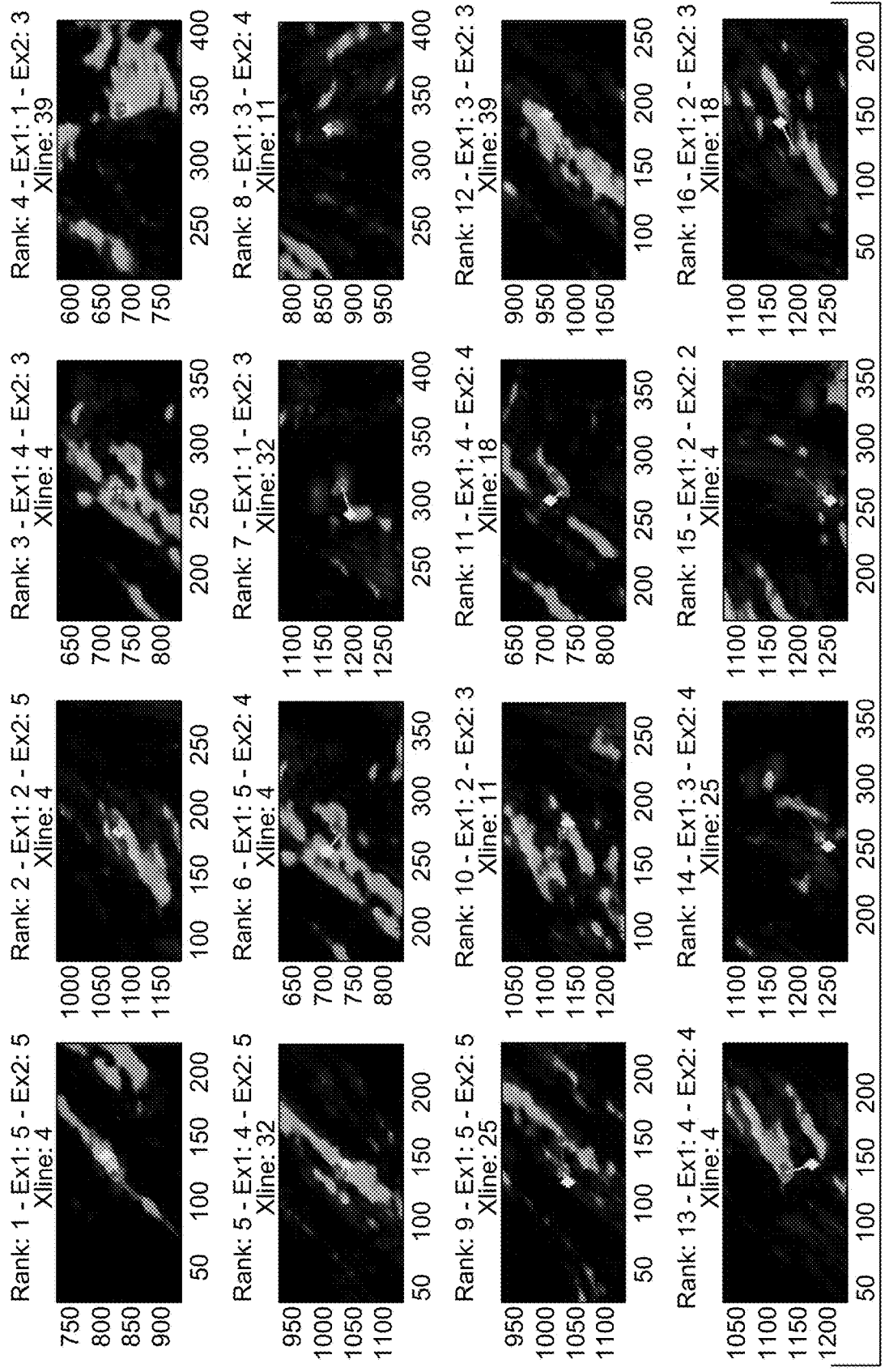
FIG. 19 depicts the first 16 configurations obtained operating at the parameter selections indicated with star 298 in FIG. 16, in accordance with aspects of the present disclosure.

FIGS. 18 and 19 show the first 16 configurations obtained operating at the parameter selections indicated with stars 294, 298 in FIG. 16. With respect to these figures, the same configuration template as depicted in FIG. 7 was used to annotate each object. X & Y-axes are inline and time axes. Each title shows the graphical modeling rank, expert scores (5 is best 1 is worst) and the crossline value.

FIG. 18 displays the result having the least Pearson and Spearman correlation obtained with parameter set $\lambda_{1,2,3} = \{10, 0.0001, 0.1\}$ and the expert scores. Similarly, FIG. 19 depicts the first 16 configurations using parameter set $\lambda_{1,2,3} = \{10, 0.0316, 0.1\}$ that result in the highest correlation results. Although, both parameter sets results in the same configuration as the first ranked one, FIG. 18 displays configurations which are unlikely to occur, such as rank 3 in FIG. 18, where both experts agreed and scored very low for this region. However, since a very large threshold was used for $E_1$ to keep initial configuration pool rich and not penalize the lateral connections properly by setting a low $\lambda_2$ value, the system returned such unlikely configurations for $S_3$. On the contrary, $S_6$ resulted in better ranking performance and more compact configurations as shown in FIG. 19.

Figure 20:
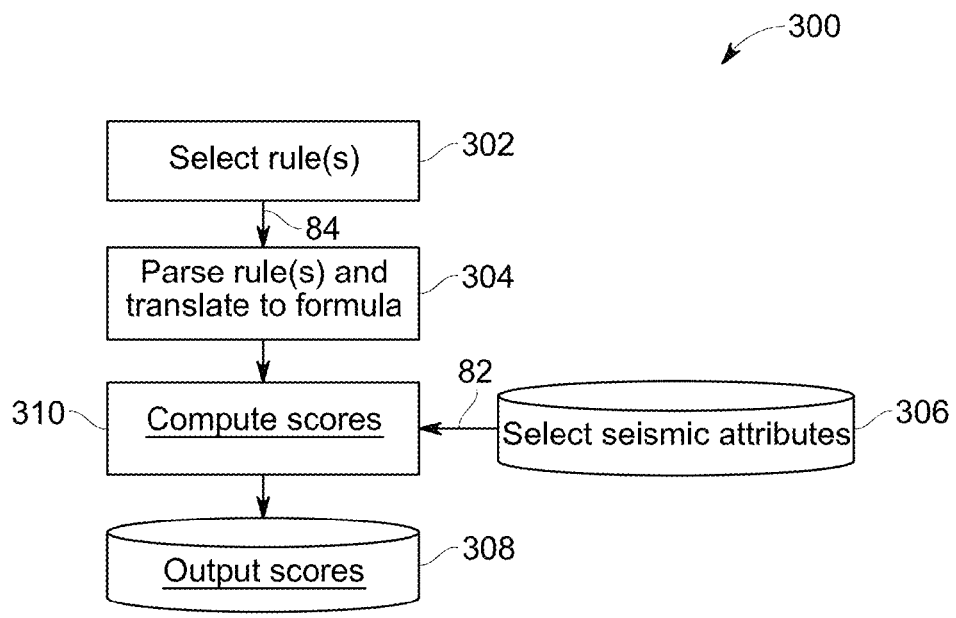
FIG. 20 depicts a flowchart describing steps of a first embodiment of the present approach, in accordance with aspects of the present disclosure.
Figure 21:
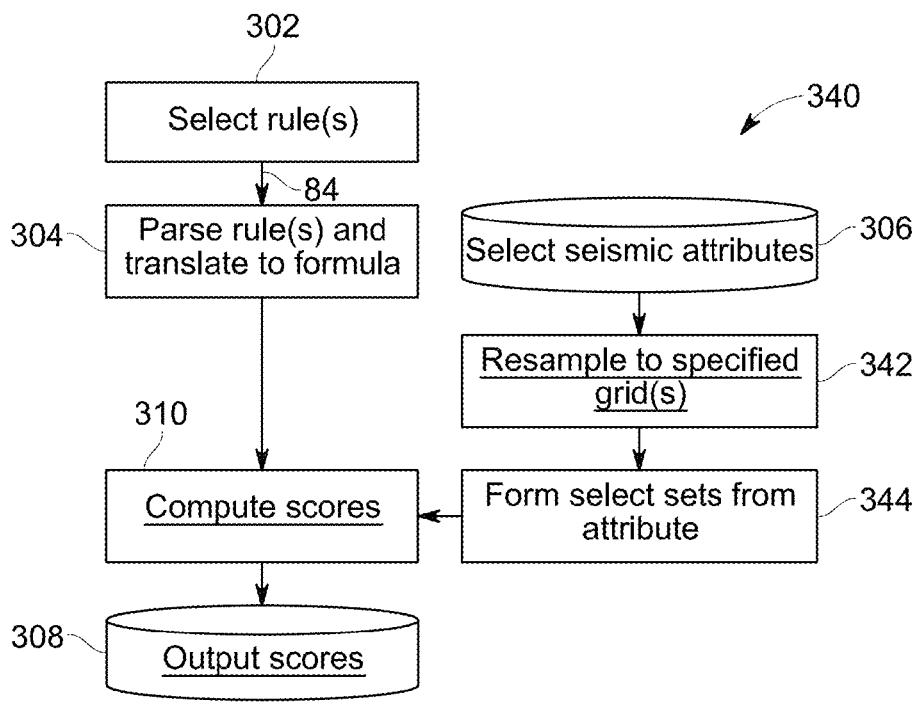
FIG. 21 depicts a flowchart describing steps of a second embodiment of the present approach, in accordance with aspects of the present disclosure.
Figure 22:
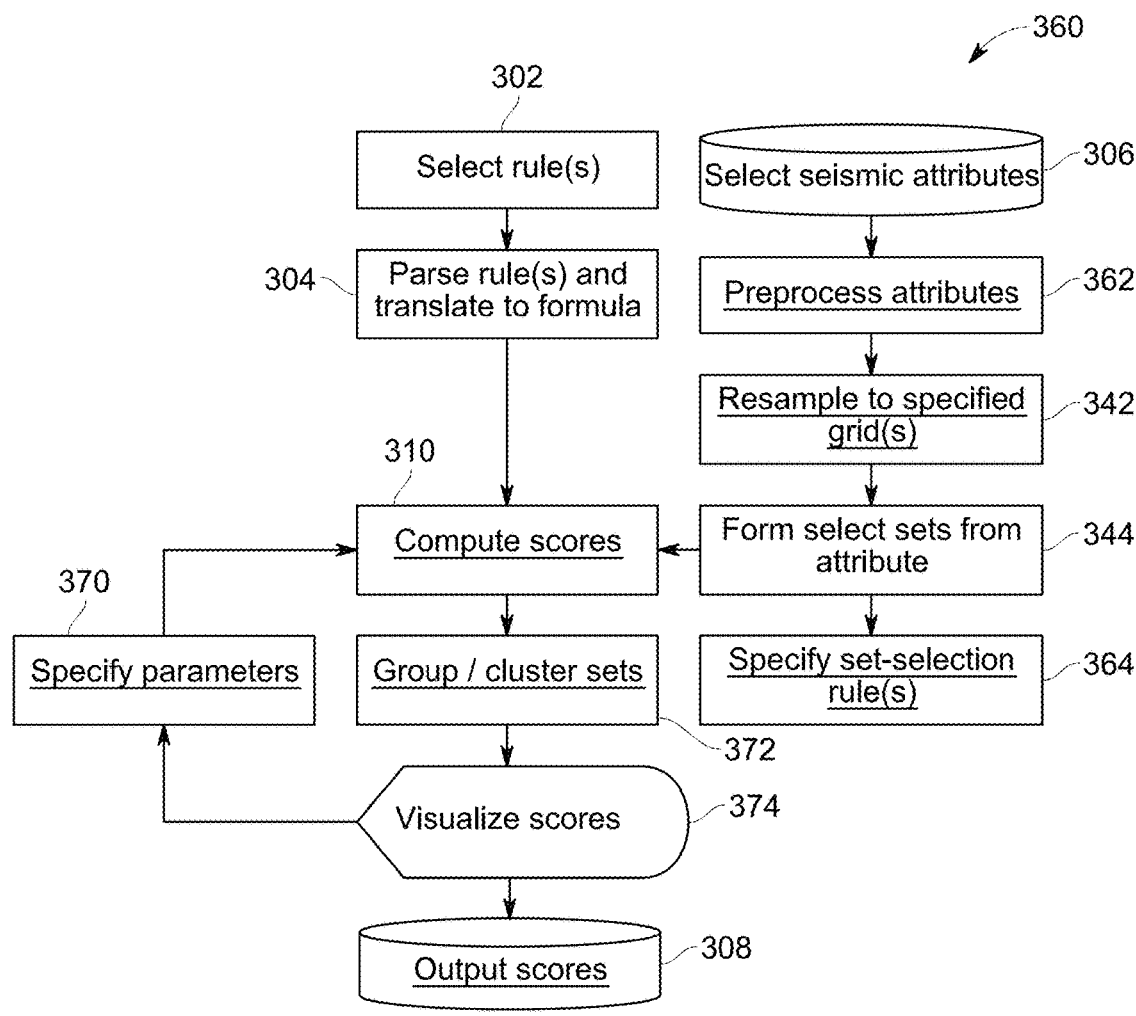
FIG. 22 depicts a flowchart describing steps of a third embodiment of the present approach, in accordance with aspects of the present disclosure.

The foregoing describes a system and case studies in accordance with aspects of the presently contemplated approach. By way of summary, FIGS. 20-22 depict flowcharts describing various steps that may be associated with the present approach as it may be implemented with different degrees of complexity. Turning to FIG. 20, flowchart 300 depicts a generalized implementation of the present approach. In this implementation, a set of rules 84 are selected (block 302) and parsed (block 304). The parsed rules are then utilized to process and score (block 310) a set of selected seismic attributes (block 306). The computed scores may then be output (block 308) for review.

Turning to FIG. 21 a further embodiment 340 is depicted in which the selected (block 306) seismic attributes are resampled (block 342) to specified grids. The size of the grids may be specified by the system 80 or by a user received input. The resampled attributes may in turn be used to form select sets (block 344) which are the basis for the scoring operation (block 310) performed based on the parsed rules.

Turning to FIG. 22, an additional embodiment 360 is depicted in which the selected seismic attributes are preprocessed (block 362) prior to be resampled (block 342). In addition, the set-selection rules are specified (block 364) prior to forming sets (block 344) using the resampled attributes. Further, based on specified parameters (block 370) the scores are computed (block 310) for the respective attribute sets and, based on the computed scores, the results may be grouped or clustered (block 372) for visualization (block 374) and review. Based on the visualization and review, the parameters may be updated or optimized and the scores recomputed until such time as an optimized or satisfactory result is obtained, at which point the scores may be output (block 308).

As discussed herein, the proposed system utilizes both expert(s) and machine interpretation to analyze events. This also allows further development of a potential user interaction and online learning system to rank any event based on joint analysis. One technical effect of the invention that is of note is that certain embodiments involve fitting a model to a fault using information from the seismic data on either side of the fault to both fit the model to the fault surface and also to determine the fault offset, or displacement, along the fault surface.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A seismic data analysis system, comprising:
a memory storing one or more routines; and
a processing component configured to execute the one or more routines stored in the memory, wherein the one or more routines, when executed by the processing component, cause acts to be performed comprising:
analyzing multiple input attributes of a geophysical or geological seismic data volume using geocontextual modeling;
calculating locations where there are configurations in the attribute space or in the geographical space that span the multiple input attributes and that obey a set of geocontextual rules to identify one or more direct hydrocarbon indicators;
scoring configurations in the data volume based on the calculations employing the geocontextual rules;
aggregating configurations into clusters; and
outputting the configuration scores to a display for review by a user.

2. The data analysis system of claim 1, wherein the geophysical or geological seismic data comprises derivative data of attributes, horizons, faults or geobodies.

3. The data analysis system of claim 1, wherein the geophysical or geological seismic data comprises one or more of well trajectories, surface seeps, gravity or magnetic or electromagnetic data or derived volumes, reservoir simulations, or production data.

4. The data analysis system of claim 1, wherein the configurations are defined in the attribute space and in the geographical space.

5. The data analysis system of claim 1, wherein the one or more routines, when executed by the processing component, cause further acts to be performed comprising:
ranking the configurations based on configuration scores; and
outputting a list of the ranked configurations.

6. The data analysis system of claim 1, wherein the one or more routines, when executed by the processing component, cause further acts to be performed comprising:
classifying the configurations based on configuration scores; and
outputting the classifications of the classified configurations.

7. The data analysis system of claim 1, wherein the one or more routines, when executed by the processing component, cause further acts to be performed comprising:
identifying anomalies based on configuration scores.

8. The data analysis system of claim 1, wherein the analysis uses graphical modeling spanning different scales.

9. The data analysis system of claim 1, wherein uncertainty in the interpretation of one or more clusters is used in scoring the one or more clusters in accordance with one or more scenarios.

10. The data analysis system of claim 9, wherein each scored cluster is displayed for reviewer validation.

11. The data analysis system of claim 1, wherein the analysis using geocontextual modeling employs a model and an inference engine.

12. The data analysis system of claim 1, wherein the one or more routines, when executed by the processing component, cause further acts to be performed comprising:
updating the initial model based on reviewer feedback.

13. The data analysis system of claim 12, wherein updating the initial model comprises modifying one or more of the following: a type and number of inputs, discretization of the inputs, configuration rules associated with the inputs, parameters of the inputs, or contextual rules or parameters of the contextual rules.

14. The data analysis system of claim 1, wherein the one or more routines, when executed by the processing component, cause further acts to be performed comprising:
updating one or more inference engine rules and/or parameters based on reviewer feedback.

* * * * *